United States Patent
Tillmann et al.

(10) Patent No.: US 7,587,636 B2
(45) Date of Patent: Sep. 8, 2009

(54) UNIT TEST GENERALIZATION

(75) Inventors: Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/323,032

(22) Filed: Dec. 30, 2005

(65) Prior Publication Data

US 2007/0033443 A1    Feb. 8, 2007

Related U.S. Application Data

(63) Continuation-in-part of application No. 11/198,569, filed on Aug. 4, 2005.

(51) Int. Cl.
    *G06F 11/36* (2006.01)
(52) U.S. Cl. .............................. 714/33; 714/45; 714/25; 714/38; 717/124
(58) Field of Classification Search .................... 714/25, 714/33, 45, 32; 717/124
See application file for complete search history.

(56) References Cited

U.S. PATENT DOCUMENTS

| 5,784,553 | A | * | 7/1998 | Kolawa et al. | 714/38 |
|---|---|---|---|---|---|
| 7,089,542 | B2 | * | 8/2006 | Brand et al. | 717/143 |
| 7,373,636 | B2 | * | 5/2008 | Barry et al. | 717/124 |
| 7,389,223 | B2 | | 6/2008 | Atkin et al. | |
| 2003/0097650 | A1 | * | 5/2003 | Bahrs et al. | 717/124 |
| 2004/0117772 | A1 | * | 6/2004 | Brand et al. | 717/132 |
| 2004/0243951 | A1 | * | 12/2004 | Hall | 716/4 |
| 2005/0050391 | A1 | | 3/2005 | Grieskamp et al. | |
| 2005/0120274 | A1 | * | 6/2005 | Haghighat et al. | 714/38 |
| 2005/0204201 | A1 | * | 9/2005 | Meenakshisundaram et al. | 714/38 |
| 2005/0223362 | A1 | * | 10/2005 | Whitlock et al. | 717/126 |
| 2006/0085156 | A1 | * | 4/2006 | Kolawa et al. | 702/119 |
| 2006/0253739 | A1 | * | 11/2006 | Godefroid et al. | 714/38 |

OTHER PUBLICATIONS

Mackinnon et al., "Endo-Testing: Unit Testing with Mock Objects," eXtreme Programming and Flexible Processes in Software Engineering—XP2000, 2000, 9 pages.*

Veanes et al., "On-The-Fly Testing of Reactive Systems," Microsoft Research Technical Report MSR-TR-2005-05, Jan. 2005, 16 pages.

(Continued)

*Primary Examiner*—Scott T Baderman
*Assistant Examiner*—Chae Ko
(74) *Attorney, Agent, or Firm*—Klarquist Sparkman, LLP

(57) ABSTRACT

A computer system provides a test program and one or more unit tests, such as a traditional unit test and or a parameterized unit test. The system also includes a constraint solver, a theorem prover, an implementation under test, a symbolic executor, a generalizor, and generated test cases. The generalizor receives a traditional unit tests as input, and modifies the traditional unit test into a parameterized unit test. The modification includes replacing plural concrete values in the traditional unit test with symbols, and exporting the symbols into a signature of the parameterized unit test. A symbolic executor identifies constraints while symbolically executing the created parameterized unit test of the implementation under test. A constraint solver and or theorem prover generates a set of test cases by solving for values that satisfy the series of constraints. The test program executes the automatically generated test cases.

20 Claims, 7 Drawing Sheets

OTHER PUBLICATIONS jtest User's Guide, Version 5.1, Parasoft Corporation, Jun. 2004, 251 pages.
U.S. Appl. No. 11/197,912, filed Aug. 4, 2005, Tillmann et al.
U.S. Appl. No. 11/198,569, filed Aug. 4, 2005, Tillmann et al.
U.S. Appl. No. 11/322,967, filed Dec. 30, 2005, Tillmann et al.
Ambert et al., "BZ-TT: A Tool-Set for Test Generation from Z and B using Constraint Logic Programming," *Formal Approaches to Testing of Software, FATES 2002 workshp of CONCUR '02*, INRIA Report, Aug. 2002, pp. 105-119.
Ball, "Formalizing Counterexample-driven Refinemant with Weakest Preconditions," *Proceedings of 2004 Marktoberdorf Summer School*, Dec. 10, 2004, 19 pages.
Barnett et al., "The Spec# Programming System: An Overview," *Construction and Analysis of Safe, Secure, and Interoperable Smart Devices: International Workshop, CASSIS 2004*, vol. 3362 of *LNCS*, 2005, pp. 49-69.
Barnett et al., "99.44% pure: Useful Abstractions in Specifications," *Conference Proceedings ICIS report NIII-R0426, University of Nijmegen*, 2004, pp. 11-19.
Bernot et al., "Software testing based on formal specifications: a theory and a tool," *Softw. Eng. J.*, 6(6)387-405, 1991.
Bidoit et al., "Algebraic system specificaton and development," *Springer-Verlag*, Chapter 1, 1991, 12 pages.
Bierman et al., "MJ: An imperative core calculus for Java and Java with effects," *University of Cambridge Computer Laboratory*, Technical Report 563, 2003, 53 pages.
Boyapati et al., "Korat: Automated Testing Based on Java Predicates," *Proc. International Symposium on Software Testing and Analysis*, 2002, pp. 123-133.
Brucker et al., "Symbolic Test Case Generation for Primitive Recursive Functions," *FATES*, vol. 3395 of *Lecture Notes in Computer Science*, Springer, 2004, pp. 16-32.
Bush et al., "A static analyzer for finding dymanic programming errors," *Softw. Pract. Exper.*, 30(7):775-802, 2000.
Colby et al., "Automatically Closing Open Reactive Programs," *Proceedings of 1998 ACM SIGPLAN Conference on Programming Language Design and Implementation*, Jun. 1998, 14 pages.
Csallner et al., "Check 'n' Crash: Combining Static Checking and Testing," *27th International Conference on Software Engineering*, May 2005, pp. 422-431.
Csallner et al., "JCrasher: an automatic robustness tester for Java," *Software—Practice & Experience 2004*, Dec. 18, 2003, pp. 1025-1051.
Detlefs et al., "Simplify: A Theorem Prover for Program Checking," *Hewlett Packard Systems Research Center*, 2003, 121 pages.
Dick et al., "Automating the Generation and Sequencing of Test Cases from Model-Based Specifications," *Industrial Strength Formal Methods, Formal Methods Europe (FME '93), Proceedings*, vol. 670 of *LNCS*, Springer, 1993, pp. 268-284.
Doong et al., "The ASTOOT Approach to Testing Object-Oriented Programs," *ACM Trans. Softw. Eng. Metholol.*, 3(2):101-130, 1994.
Flanagan et al., "Extended Static Checking for Java," *Proc. the ACM SIGPLAN 2002 Conference on Programming language design and implementation*, ACM Press, 2002, pp. 234-245.
Henkel et al., "Discovering Algebraic Specifications from Java Classes," *Proc. 17th European Conference on Object-Oriented Programming*, 2003, pp. 431-456.
JCrasher documents, http://www.cc.gatech.edu/~csallnch/jcrasher, 11 pages, downloaded Aug. 4, 2004.
Jalote, "Testing the Completeness of Specifications," *IEEE Trans. Softw. Eng.*, 15(5):526-531, 1989.
Jeffries et al., "Extreme Programming Installed," Chapters 13, 14, and 29, *Addison Wesley*, Oct. 2000, 30 pages.
King, "Symbolic Execution and Program Testing," *Commun. ACM*, 19(7):385-394, 1976.
Lahiri et al., "An Efficient Decision Procedure for UTVPI Constraints," *Technical Report MSR-TR-2005-67*, Jun. 15, 2005, 18 pages.
Lahiri et al., "An Efficient Nelson-Oppen Decision Procedure for Difference Constraints over Rationals," *Technical Report MSR-TR-2005-61*, May 26, 2005, 16 pages.
Lahiri et al., Predicate Abstraction via Symbolic Decision Procedures, *Technical Report MSR-TR-2005-53*, May 26, 2005, 19 pages.
Leino et al., "A two-tier technique for supporting quantifiers in a lazily proof-explicating theorem prover," *TACAS 2005*, Oct. 2004, 13 pages.
Loeckx et al., "The Foundations of Program Verification, 2nd Edition," Chapter 6, *Wiley*, 1987, 23 pages.
Mackinnon et al., "Endo-Testing: Unit Testing with Mock Objects," *eXtreme Programming and Flexible Processes in Software Engineering—XP2000*, 2000, 9 pages.
Marinov et al., "TestEra: A Novel Framework for Automated Testing of Java Programs," *Proc. 16th IEEE International Conference on Automated Software Engineering*, 2001, pp. 22-31.
Newkirk et al., "Test-Driven Development in Microsoft .NET," Chapters 2, 5, 7, 8, 9, 10, and Appendix A, *Microsoft Press*, Apr. 2004, 163 pages.
NUnit. http://www.nunit.org/, downloaded Aug. 4, 2005, 41 pages.
Testing, http://msdn.microsoft.com/library/en-us/vsent7/html/vxoriTestingOptimizing.asp?frame=true , downloaded Aug. 4, 2005, 1 page.
Testing, Verification and Measurement—Home, http://research.microsoft.com/tvm/, downloaded Aug. 4, 2005, 4 pages.
Tillmann et al., "Unit Tests Reloaded: Parameterized Unit Testing with Symbolic Execution," *MSR-TR-2005-153*, Nov. 2005, 17 pages.
Unit Testing, http://msdn.microsoft.com/library/en-us/vsent7/html/vxconunittesting.asp?frame=true, downloaded Aug. 4, 2005, 1 page.
Visual Studio Team System: Visual Studio 2005 Team System Home, http://lab.msdn.microsoft.com/teamsystem/, downloaded Aug. 4, 2005, 4 pages.
Visual Studio 2005 Team System Modeling Strategy and FAQ, http://msdn.microsoft.com/library/en-us/dnvs05/html/vstmodel.asp?frame=true, downloaded Aug. 4, 2005, 11 pages.
Visser et al., "Test Input Generation with Java PathFinder," *Proc. 2004 ACM SIGSOFT International Symposium on Software Testing and Analysis*, 2004, pp. 97-107.
Xie et al., "Symstra: A Framework for Generating Object-Oriented Unit Tests Using Symbolic Execution," *TACAS*, vol. 3440 of *Lecture Notes in Computer Science*, Springer, 2005, pp. 365-381.
Yorsh et al., "A Combination Method for Generating Interpolants," *Twentieth International Conference on Automated Deduction (CADE '05)*, Jul. 2005, 16 pages.
Sidney L. Hantler and James C. King. "An Introduction to Proving the Correctness of Programs." ACM Computing Surveys (CSUR) vol. 8, Issue 3 (Sep. 1976) pp.: 331 -353.
Sarfraz Khurshid, Corina S Păsăreanu, and Willem Visser. Generalized symbolic execution for model checking and testing. Proceedings of the 9th International Conference on Tools and Algorithms for Construction and Analysis of Systems (Lecture Notes in Computer Science, vol. 2619), Garavel H, Hatcliff J (eds.). Springer: Berlin, 2003; 553-568.
Robin M. Roos. Java data objects. Chapter 8, section 8.1. Pearson Education Ltd. 2003. Accessed from Safari Books on Feb. 12, 2009. (URL http://proquest.safaribooksonline.com/print?xmlid=0321123808/ch081ev1 sec1), 2 pages.
Nikolai Tillmann, Wolfram Schulte, Wolfgang Grieskamp. "Parameterized Unit Tests." Microsoft Research Technical Report. May 2005. 26 pages.
Nikolai Tillmann, Wolfram Schulte. "Parameterized Unit Tests." ESEC/FSE'05. Sep. 5,2005. pp. 253-263.
Jian Zhang, Chen Xu and Xiaoliang Wang. "Path-Oriented Test Data Generation Using Symbolic Execution and Constraint Solving Techniques." Proceedings of the Software Engineering and Formal Methods, Second International Conference. Sep. 28, 2004. pp. 242-250.

\* cited by examiner

UNIT TEST GENERALIZATION

CROSS REFERENCE TO RELATED APPLICATION

This application is a continuation-in-part and claims priority from U.S. application Ser. No. 11/198,569, filed Aug. 4, 2005, which is incorporated herein by reference in its entirety.

TECHNICAL FIELD

The technical field relates to providing testing of computer programs, and more particularly, automated generalization of unit tests.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software testing is often as expensive as software development. The goal of software testing is to provide assurance that the software behaves correctly. To this end, the tests should exercise as many parts of the developed software as possible, and they should indicate the intended behavior of the software. An implicit intended behavior is the absence of crashes. Thus, the software should respect the requirements of the execution environment.

Unit Tests are a common way to test programs, such as object-oriented programs. A unit test is a small program which provides input to a unit of the implementation-under-test (IUT), and asserts certain properties over the output of the IUT. Huge test suites of unit tests are commonly written by hand. Such unit tests are often written incrementally, as the code base increases. Determining which additional tests are needed is an expensive task. As the code base of the IUT changes, existing tests often become redundant, and new tests are written to achieve high coverage of the evolving program.

SUMMARY

In one example, a computerized method receives a unit test comprising a test of an implementation. The method then creates a parameterized unit test from the unit test, for example, by replacing plural concrete values in the unit test with symbolic values, and exporting the symbolic values into a signature of the parameterized unit test by promoting them to parameters. The method then symbolically executes the created parameterized unit test to identify path constraints of the implementation, and then creates test cases that conform to the path constraints identified during symbolic execution.

Optionally, the method replaces an object in the unit test with a symbolic object. In another example, upon identifying a test case that represents a successful path through the parameterized unit test, the method associates the test case with the parameterized unit test. However, upon identifying a test case that violates an assert statement of the parameterized unit test, the method modifies an altered parameterized unit test, and associates the test that violates the assert statement with the altered parameterized unit test. In another example, the method modifies the altered parameterized unit test by adding a program statement such as an expected exception statement. In yet another example, the method modifies the altered parameterized unit test by removing a violated assert statement.

In another example, a system tests computer programs. The system includes a digital processor and computer memory. The computer memory includes various components such as a traditional unit test of an implementation under test, and a test generalizor for modifying the traditional unit test into a parameterized unit test by replacing plural concrete values in the traditional unit test with symbols, and by exporting the symbols into a parametric signature of the parameterized unit test. The system also includes a symbolic executor for identifying constraints while symbolically executing the created parameterized unit test of the implementation under test, and a constraint solver that generates a set of test cases by solving for values that satisfy the series of constraints.

Optionally, the computer memory includes a graphical component for receiving user inputs comprising an indication of at least one of the plural concrete values to replace with symbols. The system may receive user inputs such as a user indication of at least the unit test and a coverage criteria.

In another example, a computer readable medium contains instructions for receiving a unit test of an implementation under test, and instructions for creating a parameterized unit test from the unit test by replacing plural concrete values in the unit test with symbolic values and by exporting the symbolic values into a signature of the parameterized unit test. Other instructions symbolically execute the parameterized unit test and identify one or more path conditions during symbolic execution. Additional instructions generate test cases such as inputs for the parameters of the parameterized unit test, and those instructions verify an implementation under test by executing the generated test cases as inputs to the parameterized unit test.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Brief Overview

Parameterized unit tests extend the current industry practice of closed unit tests. A parameterized unit test is a test with input parameters, a series of program statements, and one or more assertions verifying program behavior. One purpose of a parameterized unit test is to specify the external behavior for various values assigned to the parameters. The described technologies automate the creation of parameterized unit tests from traditional unit test. For example, concrete values and or objects in the body of the traditional unit test are replaced with symbols, and the symbols are exported to the parameterized unit test signature. Once created, the parameterized unit test can be used as an input to symbolic execution. Symbolic execution provides path constraints that are used in automated test case generation. Once test cases are generated, they serve as input parameters to the parameters of the parameterized unit test, thereby verifying program behavior.

For example, a specific test can be obtained (e.g., a previous closed unit test can be re-obtained) by instantiating the parameterized unit test with specific input parameters. Separation of parameterized unit tests from specific test cases supports many benefits including automated test case generation. Symbolic execution assigns symbolic input variables to parameters of a parameterized unit test. Possible path constraints of an implementation under test (IUT) are identified during symbolic execution. In one example, a graph is created that identifies constraints that must be satisfied to travel a path through a graph of states of the IUT. A constraint solver automatically generates test cases (e.g., value assignments to the input parameters of the parameterized unit test) by determining the test inputs that satisfy the constraints of an execution path through the IUT.

Additionally, symbolic execution is supported for object-oriented programs. The described object-oriented symbolic execution technology allows a parameterized unit test to include an arbitrary number of classes, plural instantiations of each class, and multiple assignments to fields within objects. The sequence of instructions executed by a program ("code path") depends on the programs inputs. An automated constraint solver and/or theorem prover automatically selects sets of inputs that exercise possible code paths through an implementation.

Context for the Discussion

Although not limited as such, the technology is described in the context of parameterized unit tests (U.S. patent application Ser. No. 11/197,912, "Symbolic Execution of Object Oriented Programs with Axiomatic Summaries", filed Aug. 4, 2005, which is incorporated herein by reference thereto) and object oriented programs.

EXAMPLE TESTS AND IMPLEMENTATIONS

Figure 1:
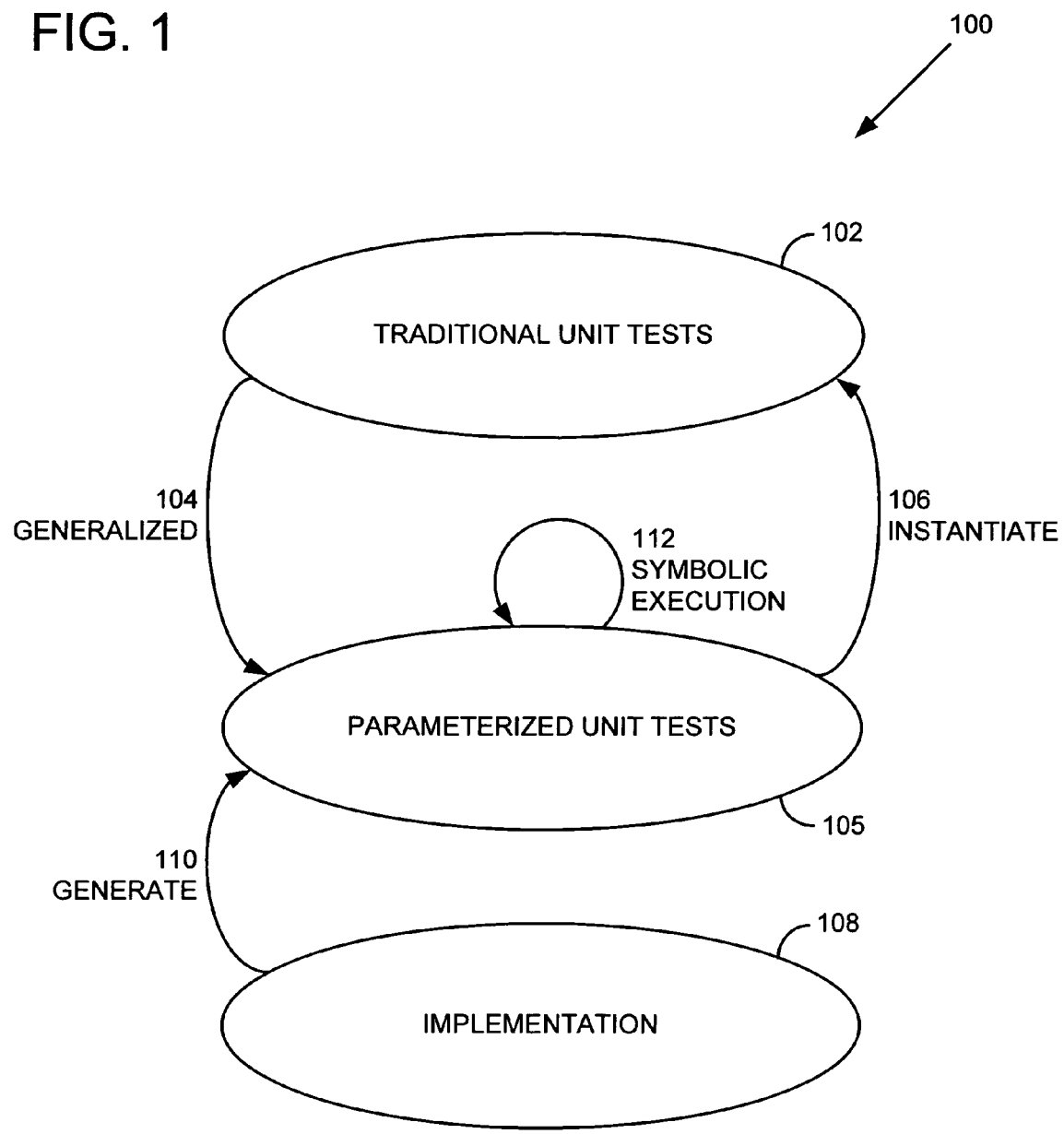
FIG. 1 is a diagram indicating relationships between traditional unit tests and parameterized unit tests.

FIG. 1 is a diagram 100 illustrating relationships between traditional unit tests and parameterized unit tests. For example, a traditional unit test (TUT) 102 has no input parameters in the unit test call signature, but instantiates one or more objects within the body of the test. The TUT verifies expected behavior after one or more calls to the instantiated object is made within the test body. The call within the body of the TUT is made with a set of one or more concrete input parameters as provided in source code by a programmer writing the TUT source code. Thus, a TUT exercises a single test path through one or more objects based upon the programmer provided input parameters.

A parameterized unit test (PUT) 105 exposes input parameters that can be instantiated with plural different concrete values in the exposed test call input parameters. For example a PUT call may exercise a path through one or more objects, and plural calls to a PUT may exercise plural paths through one or more objects. For example, different inputs (or PUT instantiations) may exercise different paths through an object, based upon the test call parameters. Thus, plural PUT calls with various input parameters are useful in verifying plural program behaviors without manually writing separate TUTs for each test. Thus, parameterized unit tests provide the possibility of exercising a program (e.g., instantiating the parameterized unit test) with various input parameters to explore or test program behavior that would otherwise require plural individually programmed traditional unit tests.

In one example, traditional unit tests serve as inputs to a method that generalizes 104 the traditional unit tests (TUT). The exemplary method generalizes 104 the TUT thereby creating a PUT 105.

In another example, a PUT is instantiated with symbolic variables as PUT inputs. These symbolic inputs can be symbols replacing concrete values (e.g., integers, Boolean, string, etc.) or symbols replacing objects. In several examples, symbols replacing objects are supported by mock objects. In one example, these symbols are exported to the signature of the test. These symbols as inputs are said to symbolically instantiate the PUT, and the symbolically instantiated PUT is symbolically executed to obtain relationships on symbolic inputs. In one such example, a mock object is created and that mock object is placed in the call to the symbolically instantiated PUT (along with other input symbolic values).

The symbolically instantiated PUT is symbolically executed to determine plural paths through an object. Relationships on symbolic inputs are discovered during symbolic execution. For example, during symbolic execution, one or more relationships are discovered based on branch tests through paths of an object or implementation. In one such example, during symbolic execution of an object under test within a PUT, a branch test within the object provides a relationship within the object code (e.g., if (X>10) call firstMethod, else call secondMethod). This relationship discovered during symbolic execution of the object helps identify PUT instantiation inputs (e.g., Test (X), where X=11, 10) that exercise various paths through the object code. In this example, symbolic execution discovers two paths for testing exploration (e.g., input X>10, and input X≦10). Thus, relationships on symbolic inputs are explored during symbolic execution in order to choose concrete inputs to a PUT. The PUT is called with the chosen concrete inputs to exercise paths through an object under test.

Such chosen inputs that exercise the PUT can also be used to automatically create code for TUTs 106. Thus, a PUT instantiated with concrete values is similar to a TUT, except that the concrete values are delivered to the PUT via the input parameters.

Thus, there is potentially a circular nature to the relationships between TUTs 102 and PUTs 105. Under that view, a TUT is generalized 104 to create a PUT. A PUT is symbolically executed 112 to discover concrete input values through an object or implementation under test. And a PUT is instantiated 106 with the discovered concrete values to exercise the object or implementation under test. Of course, the TUT itself is not necessarily needed once the PUT is created, since the PUT itself can be instantiated with the concrete values via its input parameterized.

In one example, in order to generalize 104 a TUT, a method removes one or more concrete values from the body of the TUT and replaces those concrete values with symbolic values. If desirable, these symbolic values can also be placed in the test call as input parameters to create the call signature for the parameterized unit test (PUT). The PUT then serves as input to symbolic execution which traverses the object(s) or implementations under test to discover concrete values that provide a desired coverage (e.g., path coverage). The PUT (or TUT) is then called (or in case of a TUT populated) with the concrete values to verify behavior for the desired coverage.

Customers have already written TUTs 102 for various programs. The described methods can leverage those prior existing TUTs to create 104 PUTs that can be symbolically executed 112 to provide better or more complete coverage of those existing IUTs. And, as those existing IUTs are upgraded or otherwise altered, the PUTs as automatically generated from the TUTs, provided automated test coverage of the upgraded or altered IUTs. This value is provided because of the insight that (1) parameterized unit tests can be symbolically executed to create test cases, and (2) PUTs 105 can be created or generalized 104 from existing TUTs 102, and (3) symbolic execution 112 of PUTs will discover paths automatically through altered IUTs, and create test cases for altered IUTs, automatically. Thus, without automatically creating 104 the PUTs 105 from TUTs 102, PUTs had to be generated one by one, by a programmer writing source code.

In an even more general sense, a PUT 105 can be generated 110 from an implementation 108. For example, an implementation such as object code, intermediate language code, or source code, serves as input to the generation method 110. Thus, the implementation 108 is not required to be provided in any certain format. In one such example, an implementation is a method, a function, or an object of a program. The generation method 110 receives the implementation as input, assigns symbolic input values to the input parameters of the implementation, and symbolically executes the implementation to discover paths through the implementation, and may summarize the results. For example, using the techniques described in this specification, a parameterized unit test is generated 110 from the implementation.

A PUT is automatically inferred 110 from the implementation. The generated PUT can then be symbolically executed to discover concrete input values for testing (exercising) the implementation. Additionally, a PUT generated from an implementation also serves as a specification of the implementations expected behavior.

This insight provides the possibility of not only documenting or specifying an existing implementation via generated PUTs 110, but also provides created test suites (concrete values) for testing and retesting existing implementations. For example, given an exiting implementation 108, the method generates parameterized unit tests. Parameterized unit tests are one way of specifying program behavior. Thus, the method infers a specification from an implementation. Once created, the PUTs can further be used to test or retest the implementations behavior, as it is altered and or upgraded in the software lifecycle.

Additionally, an implementation (e.g., method, function, object, etc.) is a more general form than a TUT. Thus, it is possible that generating a PUT from an implementation instead of a TUT, will provide an even more general exploration. Thus, a more detailed and complete specification of implementation behavior can often be obtained by creating a PUT directly from the implementation itself. Optionally, instead of just generating a PUT in response to an implementation input, the described technology may also provide a specification for the implementation comprising pre-conditions and post conditions. A PUT is a specification also, and this is closely related to a specification comprising pre-conditions and post-conditions. For example, an assertion is a post condition, and a guard on an input is an assumption on the input before the test is run. And, both such types of conditions can be identified via symbolic execution and provided as annotations to a generated PUT or implementation, for example, as pre-conditions and post-conditions specifications.

Interestingly, some existing tools, such as Spec# from Microsoft Corporation, receive pre-conditions and/or post-conditions specifications as inputs to check properties. In one example, given a library of implementations of code, it is desirable to understand how the implementations behave. For some implementations, tests exist that can be generalized, and for some not. Thus, a user directs the described technologies to an implementation and/or a TUT as an input, and a PUT and/or a pre-post-condition specification is generated.

Some of the PUTs can be described in terms of pre-conditions and post-conditions, but not all of them, because a PUT is more general. Although a PUT is more general than a pre-post-condition specification, many such specifications can be derived from PUTs.

Example Unit Test Generalization

A previous patent application discussed how to use a parameterized unit test as an input to symbolic execution (U.S. patent application Ser. No. 11/197,912, "Symbolic Execution of Object Oriented Programs with Axiomatic Summaries", filed Aug. 4, 2005, which is incorporated herein by reference thereto). This prior application used a parameterized unit test as input to execution, but the PUTs were written by hand. One of the many features of the technology described in this new application is that it automates the creation of parameterized unit tests from traditional unit tests. Now, in addition to the other added features, a unit test generalization method automatically generates PUTs using from traditional units tests. This automated creation of PUTs from TUTs is also referred to herein as the generalization of a unit test. These techniques help automate or increase coverage of an implementation under test (IUT). The generalized unit test is explored using symbolic execution to provide automated test coverage.

Traditional unit tests require intelligent consideration of target tested behavior, and hand coding of the TUT to test that behavior. By automatically creating a PUT from an existing TUT, the programmer saves the time that would otherwise be required to upgrade existing TUTs to PUTs. But the described methods further leverage testing efficiency, because the automatically created PUTs (from TUT inputs) can now be symbolically explored to achieve coverage of object code that the prior TUT did not cover. This additional automated coverage is available not only for the exiting implementation under test (IUT) for which the TUT was written, but the PUTs can also be used to symbolically explore future implementations of the IUT as it evolves through the software life cycle, and also other independent implementations, for example by other software vendors.

Together, the parameterized unit tests and their instantiations represent a set of unit tests. This set is minimal while maximizing coverage of the IUT. The code of the parameterized unit tests is similar to the original unit test, but with various differences, not limited to the following two examples.

First, fixed values that appeared in the unit test may have been substituted by parameters. Fixed values are constant primitive values, such as integers, but could also include newly created object instances of classes. The fixed values might reappear in the instantiations that are provided along with the parameterized unit test.

Second, assertions might have been changed during generalization. New assertions are added as described, and old assertions may have been removed. As a side effect of the generalization process, violations of requirements of the execution environment or crashes are often discovered.

Previously, a traditional unit test was described as being generalized into a parameterized unit test. Before describing a method of automated generalization, an example of a traditional unit test input and a resulting generalized parameterized unit test is considered.

Table A, below, is a traditional unit test that tests an ArrayList class. The traditional unit test shown, creates an array list, adds an object to the array list, and checks via an assert statement whether the object contained at position 0 is the object that was just added. As shown, the exemplary "TestMethod( )" signature has no input parameters. Instead, a value 1 is passed to the constructor from within the traditional unit test body. The value 1 indicates the initial capacity of the ArrayList. Here, the capacity makes sure that there will be enough space available for the call to Add.

TABLE A

```
[TestMethod]
public void TestMethod( )
{
    ArrayList al = new ArrayList(1);
    object o = new object( );
    al.Add(o);
    Assert.IsTrue(al[0] == o);
}
```

Table B is a parameterized form of the TestMethod of Table A. In this example, Table B was automatically parameterized using the described technologies.

TABLE B

```
[TestMethod]
public void TestMethod(int X1, int X2)
{
    ArrayList al = new ArrayList(X1);
    object o = new object( );
    al.Add(o);
    Assert.IsTrue(al[X2] == o);
}
```

As shown in Table B, the concrete values (e.g., "1" and "0") in the traditional unit test of Table A, have been replaced with symbolic variables (e.g., "X1" and "X2") in the parameterized case. In the example, the symbolic variables have also been exported to the TestMethod signature (e.g., "TestMethod (int X1, int X2)"). Table B is an exemplary prototypical PUT.

Example Generalization of Unit Tests

Figure 2:
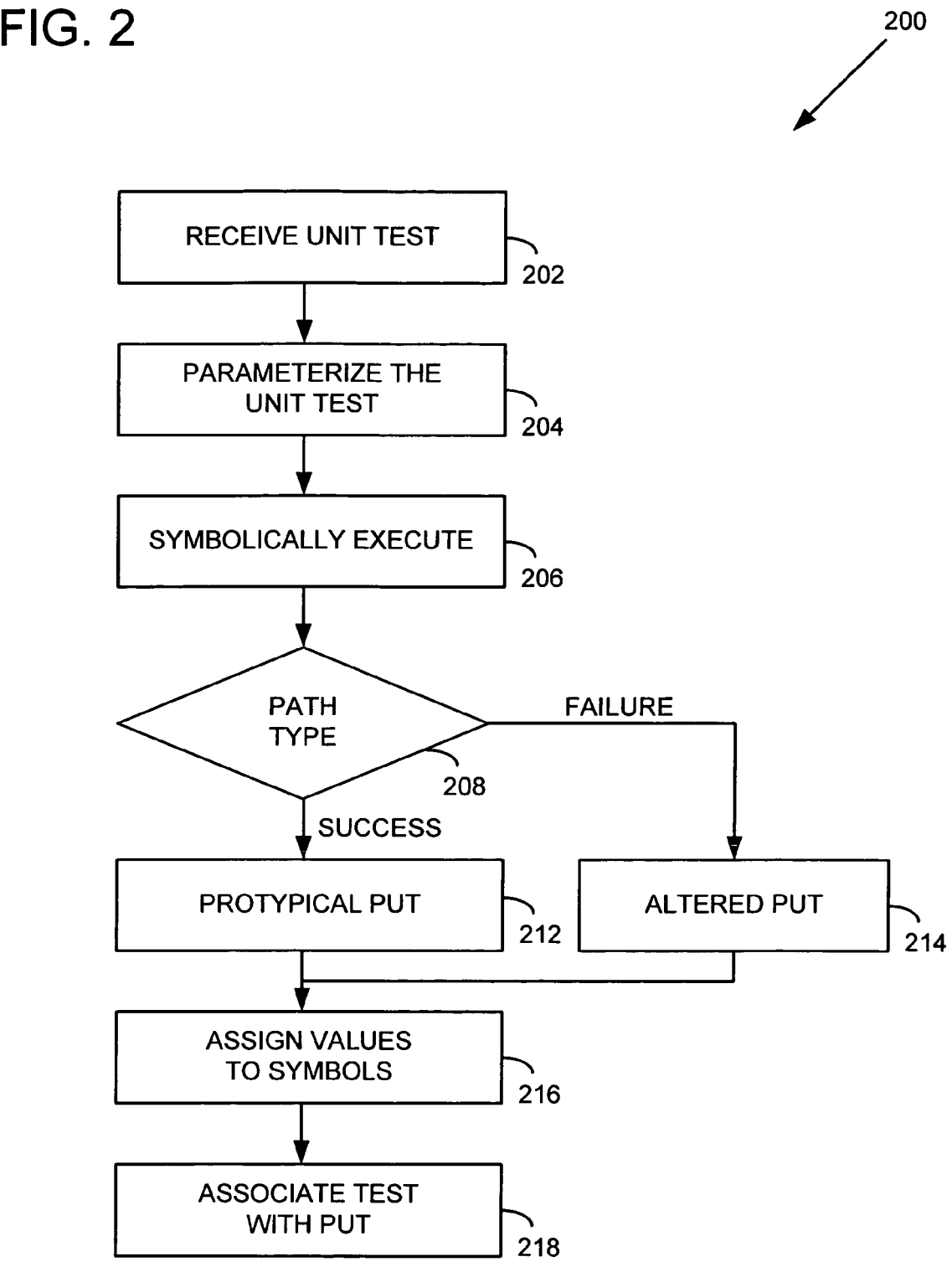
FIG. 2 is a flow chart of an exemplary method for generalizing a traditional unit test.

FIG. 2 is a flow chart of an exemplary method for automatically generalizing a traditional unit test.

A (parameterized) unit test typically contains assertions (see e.g., Table B, "Assert.IsTrue(al[X2]=o)"). In some traditional unit testing frameworks, a unit test can be annotated with a special kind of assertion, such as an "expected exception". In this example, the discussion does not consider an error on the level of the execution environment (e.g., division-by-zero error), as exceptions that could be "expected". As such, those types of exceptions are categorized as discussed below with the prototypical parameterized unit test. But that is considered within the scope of this technology also.

Given a traditional unit test (e.g., Table A), the following described method 200 provides parameterized unit tests and/or concrete instantiations for testing an IUT comprising a traditional unit test input.

At 202, the method receives a unit test as input. In one such example, the method receives a traditional unit test formed in a way similar to the traditional unit test of Table A. In one example, a unit test is a test program without input parameters, and the test program tests an implementation of some kind.

At 204, the method replaces concrete values with symbolic values. In one such example, the method replaces concrete values such as integers, characters, Booleans, strings, etc., appearing in the text of the unit test, with symbolic values. Optionally, at 204, one or more of the replaced symbolic values within the body of the unit test are also exported as input parameters to the unit test (thereby creating input parameters of a prototypical parameterized unit test). Thus, the method creates a parameterized unit test from the unit test comprising replacing plural concrete values in the unit test with symbolic values and exporting the symbolic values into a parametric signature of the parameterized unit test.

Optionally, objects are also contemplated as inputs and outputs via parameters of parameterized unit tests. Thus, at 204, one or more concrete objects or real objects are replaced with symbolic objects (e.g., mock objects). Real objects have real behavior, so if a method on a real object is called (or a message is sent to a real object), it will return a real result. Whereas, a mock object has real behavior but it is very shallow. In one example, the mock object represents a real database object. In that sense, the corresponding mock database object wouldn't necessarily have the database behind it. Thus, when the mock object is accessed, it immediately returns a fictitious answer. For the purposes of unit test generalization, the mock objects can be treated as symbolic entities. In this case, when a mock is invoked, it returns not a concrete value, but a symbolic value. Thus, optionally, the method treats a mock object as a symbolic entity. And, when the mock object is invoked it may receive and or return a symbolic value. A mock object is also provided as (exported) a parameter of a PUT. In one such case, an object created inside a TUT, is referenced symbolically, and the symbolic reference is lifted up into the input parameters of the PUT. Thus, when the PUT is executed, it can also be called with a symbolic mock, and later instantiated with a concrete object, just as done with concrete values.

Interestingly, values generally have a consistent behavior. The value "5" or the string "dog" behave in a consistent way. Whereas, an object can return a different value based on the order or number of times it is called. This is because an object behavior may be dependent on an internal state, which may have changed based on internal code. Thus, each time a mock object is called it returns a fresh symbolic value that is not constrained to be equal or different from any other values that appeared so far. These symbolic values are considered by a constraint solver when considering path behavior, and/or when solving for concrete values for creating tests.

In one such example, creations of new object instances of a class (e.g., "new Class( . . . )" in C# or Java syntax) where the resulting object is used in a way, such as when a contract of the class matters (e.g., "Contract c=new Class( . . . )") are also replaced by parameters. In one such example, the object is annotated as a mock object, as described below.

At 206, symbolically executing the parameterized unit test to identify path constraints of the implementation. Or, the parameterized unit test is explored using symbolic execution. In one such example, the prototypical parameterized unit test is explored with symbolic execution. Symbolic values are used as inputs. Symbolic execution discovers possible execution paths based upon relationships of symbolic input values discovered during symbolic execution.

At 208, when a path is discovered during symbolic execution, if the path type is labeled successful 208, then a parameterized unit test of the prototypical kind is generated at 212, otherwise an altered parameterized unit test is generated at 214. For example, a path is discovered when symbolic execution completes a path through an implementation under test.

In one such case, depending upon the type of paths discovered during symbolic execution, the tests associated with the path are placed in separate sets. For example, if a path terminates successfully (e.g., no assertion of the parameterized unit test is violated, and no unexpected exception is thrown), or if the path leads to a failure on the level of the execution environment (e.g., a division-by-zero error in the IUT), then that path is labeled successful, and a prototypical PUT is generated 212. However, if a path leads to a failure of an assertion (i.e. a violation of an explicit assertion, or a mismatch between the actually thrown exception and the expected exception), then that path is labeled a failure and an altered PUT is generated 214.

At 212, a prototypical PUT is generated. The method then continues at 216.

At 214, an altered PUT is generated. In one example, the altered PUT is almost identical to the prototypical parameterized unit test. However, in one example, the failing assertion is simply removed to create the altered PUT. In another example, for tests assigned to this altered PUT (e.g., below at 218), if an exception was actually thrown, this generated altered PUT is annotated with this actual thrown exception type as an expected exception. The method then continues at 216.

At 216, creating a set of test cases that conform to path constraints identified during symbolic execution. Or, the method finds a solution for the path through the implementation. For example, the solution is an assignment of concrete values to the PUT, such that the PUT will exercise that path when the PUT is called with the concrete values.

At 218, the method associates the path solution generated in 216 with its associated PUT generated at 212 or 214. Examples of PUTs and their associated tests are shown below in Tables C and D.

Thus, tests (e.g., assignments of concrete values to PUT input parameters) that exercise paths labeled successful, are assigned to the first set of inputs associated with a generated prototypical parameterized unit test, such as shown in Table B. In one such example, the test inputs are concrete values assigned to the input parameters of the parameterized unit test. In one such example, the test inputs are generated by a constraint solver using the relationships on symbolic values formed during symbolic execution. Once path constraints are identified via symbolic execution, many constraint solvers or theorem provers will solve for concrete input values that will cause that path to be followed.

Depending on what kind of path is discovered 208 during symbolic execution, different parameterized unit tests are generated 212, 214, each is then associated with its generated test sequences 218. In one such example, these tests are generated into two sets of test sequences, each set of test sequences associated with a generated parameterized unit test 218.

However, if a path leads to a failure of an assertion (i.e. a violation of an explicit assertion, or a mismatch between the actually thrown exception and the expected exception), then tests that exercise paths that fit this second case, are assigned to a second set of inputs associated with an appropriately altered PUT.

Example Prototypical and Altered PUTs

In another example, the following two parameterized unit tests were generated using the method described with reference to FIG. 2. In this example, Table C is described as the prototypical or successful PUT and Table D is described as an altered PUT.

TABLE C

```
/// <row> <X1>1</X1> <X2>0</X2> </row>
/// <row> <X1>0</X1> <X2>0</X2> </row>
[TestMethod]
[InlineDataSource]
public void TestMethod1(int X1, int X2)
{
    ArrayList al = new ArrayList(X1);
    object o = new object( );
    al.Add(o);
    Assert.IsTrue(al[X2] == o);
}
```

TABLE D

```
/// <row> <X1>-1</X1>
/// <row> <X1>1</X1> <X2>-1</X2> </row>
/// <row> <X1>1</X1> <X2>1</X2> </row>
/// <row> <X1>0</X1> <X2>-1</X2> </row>
/// <row> <X1>0</X1> <X2>1</X2> </row>
[TestMethod]
[InlineDataSource]
[ExpectedException(ArgumentOutOfRangeException)]
public void TestMethod0(int X1, int X2)
{
    ArrayList al = new ArrayList(X1);
    o = new object( );
    al.Add(o);
    Assert.IsTrue(al[X2] == o);
}
```

In this example, Table D is a PUT that is generalized for all the paths in which illegal arguments were passed to methods of the ArrayList, which lead to ArgumentOutOfRangeExceptions. Whereas, Table C is generalized for all successful test runs. Providing the two PUTs distinguishing success from failure, aids in human understanding, but is not a required. Each parameterized unit test shown in Table C and D is associated with sets of test parameter instantiations.

Each row represents a test and the rows are specified as inline using XML. There is one test instantiation per row. Two instantiations of the parameters of the prototypical PUT of Table C are needed to achieve full coverage of the IUT. These two successful input tests differ in the initial capacity of the array list. Each successful test represents a path through the array list implementation.

For example, when the initial capacity of the array is set to zero (e.g., X1=0), a different code path in the Add method will be taken which resizes the internal capacity to accommodate the added object.

In Table D, the tests fails if the array is indexed with any value other than zero, and thus the expected exception is an out-of-range-exception. Thus the test cases are inferred automatically, once the TUT is generalized into a PUT, and the PUT is executed symbolically. This is because the symbolic execution provides the branch conditions on the various input values, such as an in this case, where the array is indexed at out-of-range locations.

In one example, a path that reaches assertions that are not violated is considered successful. Further, in the successful set of tests (e.g., Table C) there should not be exceptional behavior which can be specified. Such exceptional behavior that can be specified, is specified, by annotating (altering) the altered parameterized unit test to reflect this newly annotated and expected behavior.

Exceptional behavior that can not be specified (e.g., by annotating the altered PUT to expect that exception), typically causes an unpredicted exception to be thrown, and thus the intended PUT assertion (e.g., "Assert.IsTrue(al[X2]==o") is never reached. Thus, although it may initially sound counter-intuitive, such exceptional behavior that can not be specified is also placed in the successful test set. For example, when a program statement tries to open a file, and the file does not exist, it is expected that a "file does not exist" exception will be thrown. Thus, the altered PUT is annotated to expect a "file does not exist" exception. Thus, the method may add new assertions or remove assertions from the altered PUT. Thus, paths that cause the method 200 to mutate program behavior, are placed into the altered PUT, along with its associated test cases.

But if instead of a "file does not exist" exception, a "can't divide by zero" exception is thrown, then that is just a bug. Thus, passes that terminate successfully, or that display a bug, are categorized in the successful test set (e.g., Table C). This set will end successfully or trigger a bug, and thus, there is no need to alter the PUT, for example, with an additional assertion.

When a PUT is later instantiated with a test case comprising concrete values from the "successful" set, then that form of unexpected behavior is covered during concrete instantiation (e.g., 106, FIG. 1).

Previously it was stated that a PUT is annotated with an expected exception annotation upon discovering a failed path via symbolic execution. Similarly, a failed explicit assertion can sometimes be modified easily to obtain new assertions, such as when the assertion statement compares an immediate output of the IUT with a concrete value. For example, by varying values, higher coverage can be obtained. But the above algorithm sometimes turns concrete values into parameters although varying them does not lead to higher coverage. Such cases can be determined during solution-finding. For example, if for a given parameter there is a single solution that works for each path associated with a parameterized unit test, then that parameter of the generated parameterized unit test can be eliminated.

Tables C and D provide XML data inputs, or a database of inputs, as "inline data". As described above, each row is a concrete instantiation, and the database serves as inputs that exercise the associated PUT. However, no such arrangement is required to practice the described technology. For example, these PUTs do not hold for all arguments, but only for those arguments enumerated in their associated data base. In another example, no such limitation would hold. Here the same method was explored, and two sets were provided as output.

In another example, a single parameterized unit test is provided, including successful and altered program code and associated concrete values. In yet another example, altered PUTs and associated tests are divided in other ways, to provide other user insights, or testing efficiencies. But in any case, the cases are discovered or identified via symbolic execution. And, the behaviors are grouped or combined to provide desired views or granularity of views of behavior, whether for all input arguments, or in sets of input arguments.

Interestingly, instead of providing an inline database of test cases, another method is considered. A parameterized unit test provides a set of assumptions regarding inputs, such as textual annotations, pre-conditions, etc. For example, an assumption on inputs verifies that a test call fits at least one of the constraints, comprising a test case (e.g., assume (X1==1^X2==0) or (X1==0^X2==0)). Thus, the PUT would hold for all values, because the assumption filters out non-conforming values. Other assumptions may also provide ranges for test cases.

Figure 3:
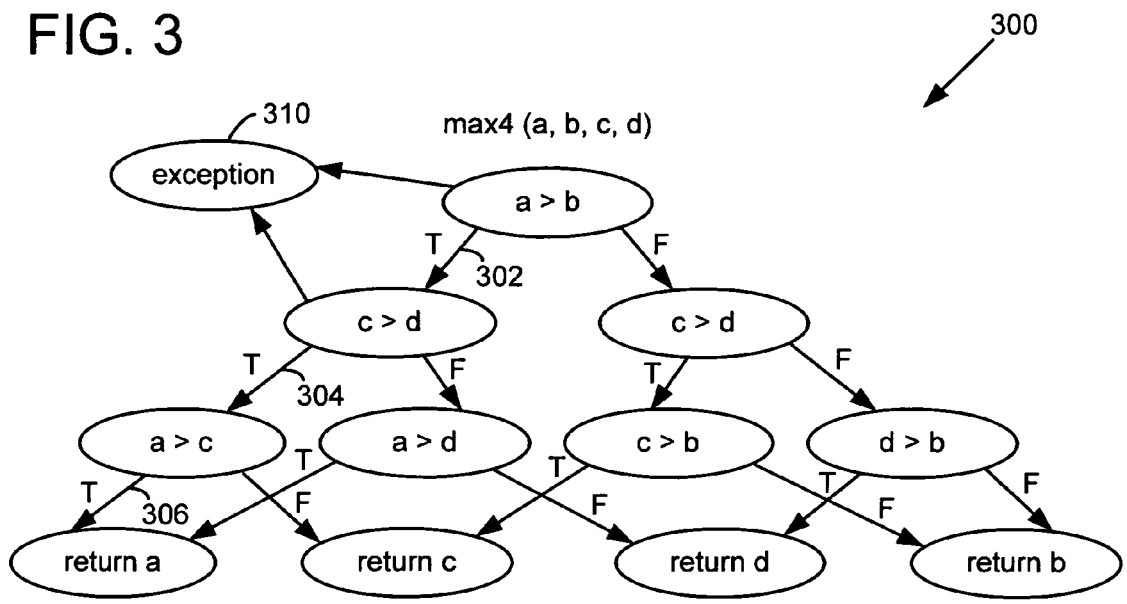
FIG. 3 is a graphical tree representing paths of conditions of a symbolic execution.

FIG. 3 is an exemplary tree representing branch conditions for paths of an implementation under test. For example, whenever a leaf of the tree is reached, there is a conjunction of predicates or constraints that must have been followed to reach that leaf. Thus, a leaf represents a conjunction of predicates satisfied to reach the leaf. A leaf may be an expected exception (that was annotated to the altered PUT), or an unexpected exception, or a successful exit. In this example, there are two successful cases (e.g., return a, b, c, d) and two exceptions (e.g., where a=b^c=d).

Example Additional Variations on Unit Test Generalization

Various other aspects of automated generalization of traditional unit tests are interesting to consider. For example, the described method uses symbolic execution techniques to generalize tests. Parameterized unit tests and their associated instantiations represent a generalized test. These generalized test forms are created via automated test generalization. Thus, a generalized unit test can be used to discover program bugs by generalizing tests, or verifying program behavior. For example, a traditional unit test can be used as input to a process that provides an automated generalization of the test into a parameterized unit test. The parameterized unit test can be used as input to an automated method for generating new tests, such as via symbolic execution, and constraint solving to obtain new tests.

The described methods provided generation of new tests, including new assertions such as assertions about exceptional behavior. Further, user annotations can be used to indicate which values to generalize (e.g., which values to replace with symbolic values). This allows a tester to indicate an area of concern or to explore. The resulting generalization reflects a symbolic execution and discovery of branches through the area of interest. Such a user annotation could be provided via source code, graphical user interface (point and click), enumeration, reflection and selection, etc. Finally, the methods provide a minimal number of generated new tests while maximizing coverage to IUT, such as path coverage.

There are other improvements that modify program code to correct behavior. For example, when an assertion verifies a value (e.g., "Assert.IsTrue(al[X2]=o)", but the return value was inconsistent (e.g., returned value is another object labeled "t" and not "o"), then the assertion is altered to indicate the returned value (e.g., "Assert.IsTrue(al[X2]=t)". Thus, a PUT is altered to provide an assert statement for the returned inconsistent value.

In another example, when an assertion verifies certain behavior, but the desire is to verify more behavior, then additional behavior is provided via the verified behavior, using new criteria. For example, symbolic execution often provides very good coverage, such as path coverage of an implementation under test (IUT). However, a more common coverage is code coverage of the IUT. Thus, by selecting code coverage, the symbolic execution or test case coverage reduces work when code coverage criteria is provided, which is more scalable. A graphical user interface can be used to identify various inputs such as coverage criteria, user annotations, test selection, implementation selection, etc. A property of symbolic execution is coverage requirements, whether path coverage, code coverage, etc.

Additionally, not every value needs to be a parameter. Thus, values may be indicated by user annotation (e.g., by list, source, etc.), or values may be eliminated when the tests indicate that a certain parameter does not vary behavior.

Example Symbolic Execution

With symbolic executions, instead of using concrete values, operations are performed on symbolic values. Symbolic execution uses symbolic input values, with abstract names, and then builds expressions as a program manipulates the input symbolic values. Thus, expressions such as A+B are used instead of concrete values, such as 4, as can be computed from 1+3.

Whenever the program execution arrives at a point which can only be reached when a certain condition has been met, e.g., after a conditional branch, a condition or constraint is generated that includes symbolic inputs whose precise value does not have to be determined. For example, a condition could be one or more symbolic values in a relationship (e.g., x<4, y+4<z, etc.).

A symbolic state of a program may map variables to expressions which may include symbolic expressions that may contain concrete values such as constants. Thus, variables hold expressions.

For example, if a table of values has columns representing variables, and rows indicate progressing states of a symbolic execution, expressions are assigned to variables for a state. So instead of concrete values at a variable or field, there is an expression (e.g., a+b) which represents some operation on the inputs or other state in the program. Of course, the table itself is not required for symbolic execution, it is just an example representing how symbolic execution uses symbols to represent execution.

Consider the following functions max and max4,

```
int max (int x, int y)
{
    if x > y return x;
    else return y; }
int max4 (int x, int y, int z, int w)
{   int u = max (x, y);
    int v = max (z, w);
    int t = max (u, v);
    return t; }
```

If the function max4 (x, y, z, w) is called with symbolic variables, a, b, c, and d instead of concrete integer values, then the following Table E represents a symbolic execution.

TABLE E

| State | Variables | | | | | | |
|---|---|---|---|---|---|---|---|
| | X | Y | Z | W | u | V | t |
| 0 | A | B | C | D | — | — | — |
| 1 | A | B | C | D | A or b | — | — |
| 2 | A | B | C | D | A or b | c or d | — |
| 3 | A | B | C | D | A or b | c or d | a, b, c, or d |

The symbolic execution represents many possible executions for the symbolic inputs a, b, c, and d, thereby representing many instantiations of integer assignments to a, b, c, and d. Symbolic executions may also be represented in other ways, such as a graph, or as a textual description, etc.

FIG. 3 is a tree representing paths of conditions on exemplary symbolic inputs. For example, the above max functions may traverse the conditions of the tree 300 based on concrete integer assignments to input variables x, y, z, and w. Each path down the tree represents a path that might be tested if providing coverage of a program is desired. Gathering the relationships of operations on symbolic inputs provides information useful in creating concrete assignments to x, y, z, and w. For example, inputs are selected that cover the behavior generated by symbolic execution, such as covering paths of a tree to verify program behavior. Thus, by parameterizing unit tests and performing symbolic execution on symbolic values, concrete assignments that explore the behavior of a method can be generated automatically.

Example Symbolic Execution of Object Oriented Programs

In order to support symbolic executions of object oriented programs, various techniques are considered. Consider the following code,

```
void min(int z, int r)
    int x;
    int y;
    ...        }
```

The variables z, r, x, and y are identifiable, and can be traced as the 'min' method executes. However, this is not so straightforward when objects are considered. Consider the following code,

```
Class C {
    int f;
}
    void compare (C x, C y, int z, int w) {
        int u = 5       // state = 1
        x.f = z         // state = 2
        y.f = w         // state = 3
        if (x.f == 10)  // state = 4
    ... }
```

If the method 'compare' is called with symbolic values, such as compare (a, b, c, d), then Table F provides one example representation of a symbolic execution.

TABLE F

| State | u | Z | W | Fields |
| --- | --- | --- | --- | --- |
| 0 | — | C | D | { } |
| 1 | 5 | C | D | { } |
| 2 | 5 | C | D | update ({ }, a, f, c) |
| 3 | 5 | C | D | update (update ({ }, a, f, c), b, f, d) |

As shown in Table F, input symbols c and d are assigned to input parameters z and w, whereas objects and their associated fields are symbolically noted with a field's column. For example, the objects field's section represents a map of objects and the object's associated field assignments. Thus, the field's column contains symbolic information that can be used to track and create concrete assignments to an arbitrary number of different objects, and to the various and arbitrary assignments that may occur to their associated possibly multiple fields. In this example, an update function contains four parameters. The first parameter is the state of the fields (e.g., heap) before the present update. Here, "{ }" is used to represent the initial heap in which no field has been updated yet. Other initial heaps are possible. The second parameter of the update function is the identifier of a symbolic instantiation 'a' of the class C. The third parameter is the field in 'a' to update, and the fourth parameter contains the symbolic value 'c' that is assigned to field a.f. Conditions can involve a particular state of the fields, e.g., the condition of the if-statement in the above program can be represented by the following expression:

select (update(update({ }, a, f, c) b, f, d), a, f)==10

From these symbolic values relationships, concrete value can be automatically generated (via a constraint solver and/or theorem prover) that will explore various paths of a tree representing possible Executions.

Figure 4:
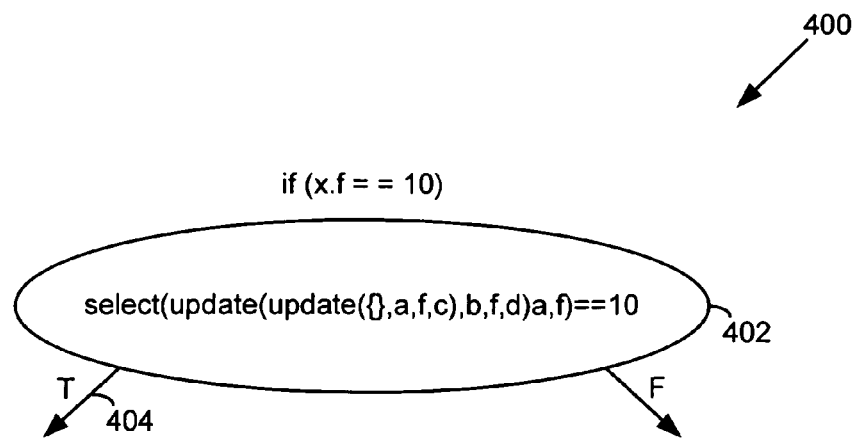
FIG. 4 is a tree representing exemplary paths of conditions of a symbolic execution.

FIG. 4 is a tree representing exemplary paths of conditions of a symbolic execution. For example, a select function obtains a symbolic value at field f of symbolic object 'a' and compares it to constant value '10'. Thus, coverage of this tree is provided by assigning concrete values such that a.f is equal to and not equal to '10' after state 3 of Table F. It is interesting to note that Table F and FIG. 4 represent possibly all calls that can be made on the 'compare' method. For example, even if a and b are the same object, the fields update column of Table F, and the comparison 402 in the tree 400 represent the behavior. Thus, the information is saved in a general way that can be used to generate concrete inputs for coverage, where 'compare' is called with inputs that cover paths of the tree 400, in cases where objects 'a' and 'd' are the same or different, and in cases where variables 'c' and 'd' are the same or different. Test case generation is identifying input values that solve the constraints that exist along one path of a graph (e.g., FIG. 3, 302, 304, 306, or FIG. 4, 404). Often it is desirable to provide a minimum or reduced number of inputs to cover paths of a graph. However, full coverage is not always required, as automated testing of even partial coverage is often valuable. A constraint solver is typically able to solve paths of constraints to provide input values, once the constraint solver is provided the path constraint information developed during symbolic execution.

Example System for Testing Programs

Figure 5:
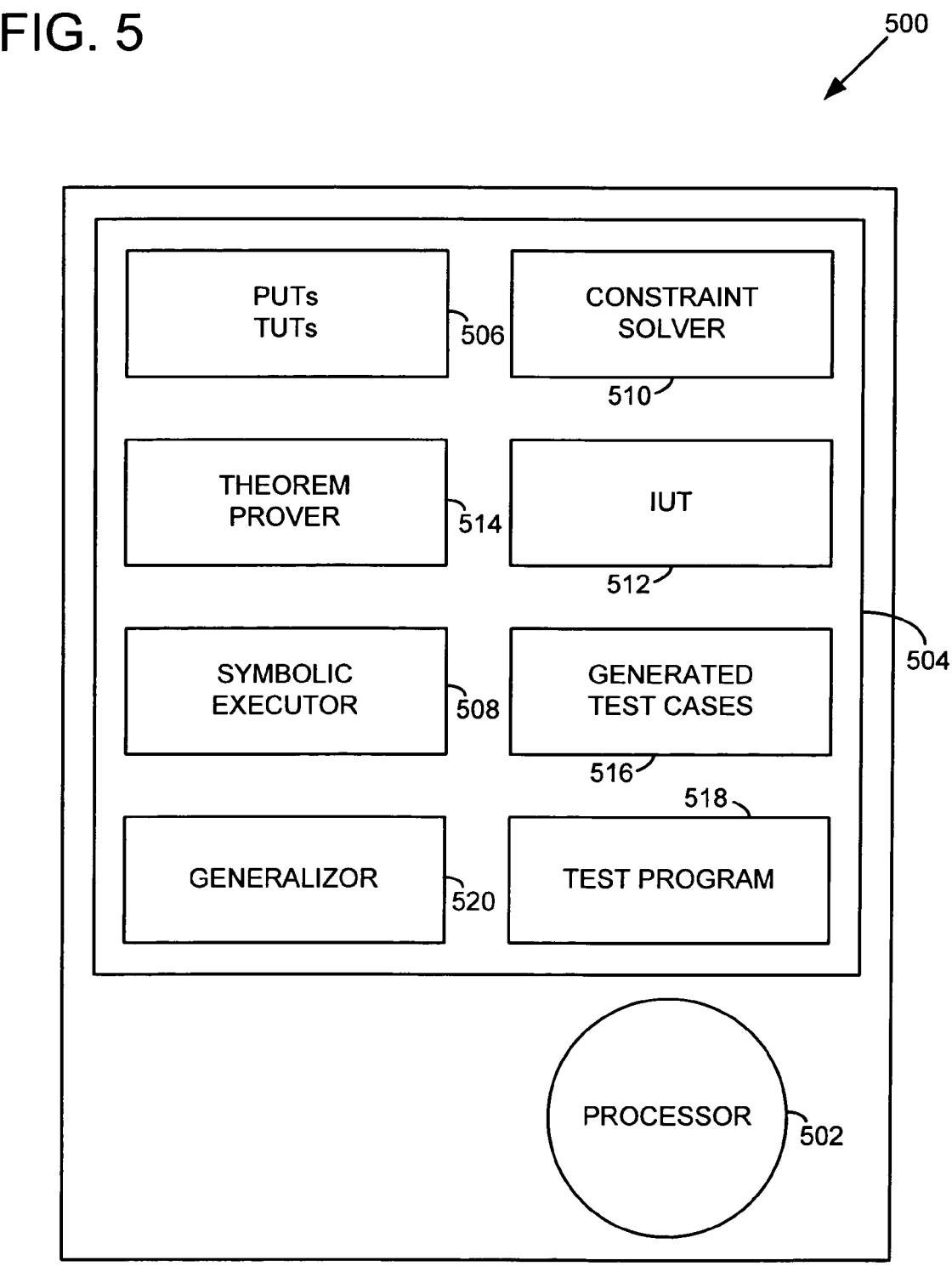
FIG. 5 is a block diagram of an exemplary system providing unit test generalization.

FIG. 5 is a block diagram of an exemplary system for testing programs. The system 500 comprises a digital processor 502, digital memory 504, a test program in memory 518, and several other computer readable resources including one or more unit tests 506 (such as a traditional unit test and or a parameterized unit test), a constraint solver 510, a theorem prover 514, an implementation under test (IUT) 512, a symbolic executor 508, a generalizor 520, and generated test cases 516.

In one example, the test program directs an automated test case generation using various other components such as the described resources 504. A parameterized unit test is a test with input parameters, a series of program statements, and one or more assertions verifying program behavior. The generalizor receives a traditional unit tests as input, and modifies the traditional unit test into a parameterized unit test. The modification includes replacing plural concrete values in the traditional unit test with symbols, and exporting the symbols into a parametric signature of the parameterized unit test. A symbolic executor 508 identifies constraints while symbolically executing the created parameterized unit test of the implementation under test. A constraint solver 510 and or theorem prover 514 generates a set of test cases by solving for values that satisfy the series of constraints. The test program 518 executes the automatically generated test cases 516 and optimally directs other resources. Optionally, the parameterized unit test 506 includes program statements that require the symbolic execution of objects and associated fields. If so, an arbitrary number of (1) object classes, (2) instantiations of objects of a class, (3) and/or assignments to plural fields per object are supported using a series of nested updates that include a history of the heap, a symbolic object presently being updated, a field of the symbolic object being updated, and a value (e.g., a symbolic value) updating that field. Optionally, the system includes a graphical component (not shown) for receiving user inputs comprising an indication of at least one of the plural concrete values to replace with symbols. The graphical component generates on-screen choices such as unit test selection or code coverage criteria.

Example Relationship of Interfaces, Methods, Classes

In object oriented programs like C# or Java, an interface defines a contract (or format) consisting of a set of method signatures. Thus, an interface defines how queries or messages are passed between objects. For example, an interface defines method signatures. A method signature specifies the name of the method and requirements for the method's inputs and outputs. A class can implement one or methods, such as a set of interfaces. Thus, a class provides behavior for the method signatures. An object is an instance of a class. For example, a parameterized unit test can be viewed a test that requires objects that fulfill certain interface contracts or that must be instances of specific classes.

Example Method Generating Mock Objects

The following discussion describes how to generate mock behavior in the context of mock objects in the environment of parameterized unit tests. But upon understanding how to automatically create mock behavior, one of ordinary skill in the computing arts will appreciate that the described technology can be used throughout the computing sciences, without limitation to mock objects or parameterized unit tests. The following method includes various steps to generated mock objects for parameterized unit tests.

Figure 6:
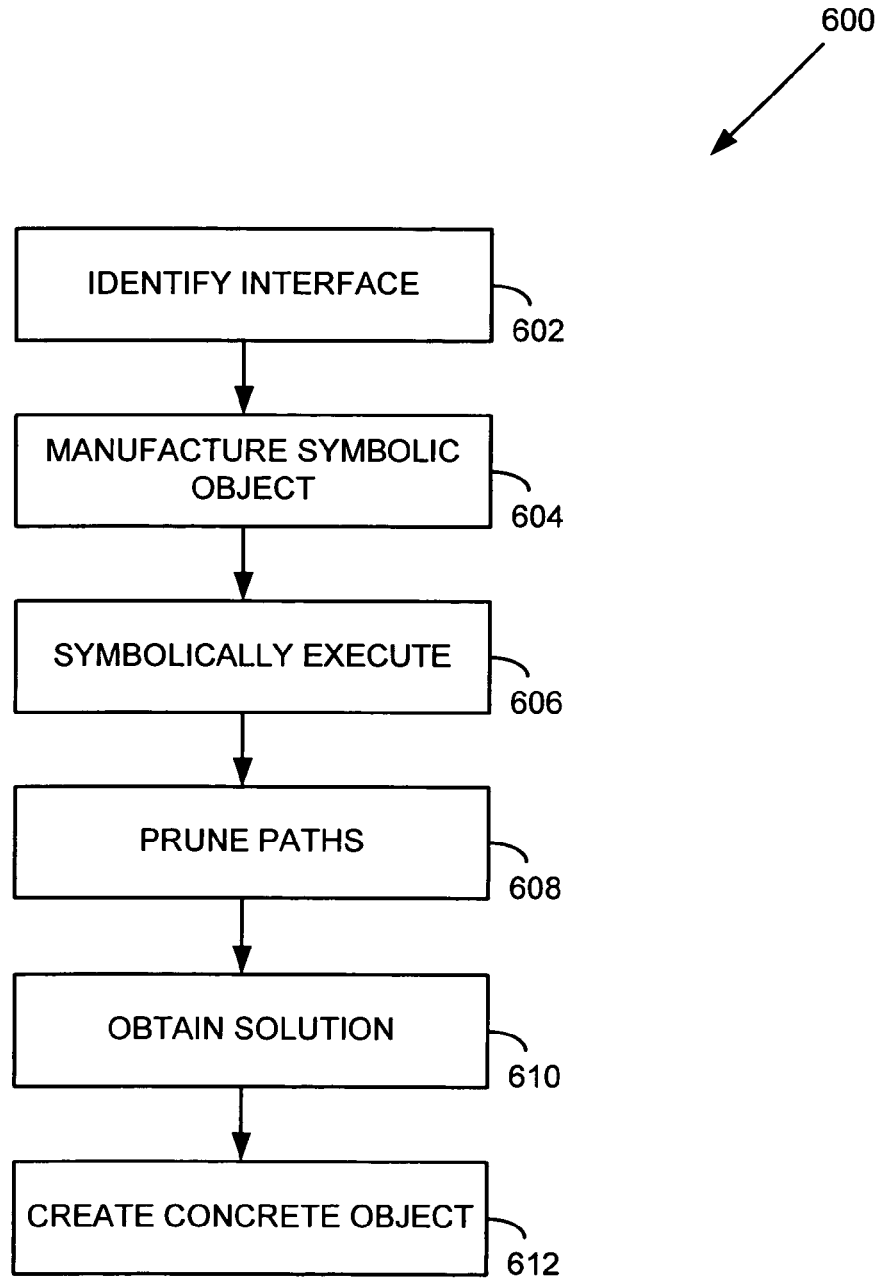
FIG. 6 is a flow chart of an exemplary method for generating mock behavior.

FIG. 6 is a flowchart of an exemplary method for generating mock behavior.

At 602, the method identifies an object fulfilling an interface contract. Or, the method identifies a class, an interface, or a delegate, with defined call signature(s), for example, as an input parameter of a parameterized unit test. Or, at 602, the method identifies a call to an external resource that requires mock behavior. For example, if an object fulfilling an interface contract is required as input as a parameter to a parameterized unit test, the method identifies the need for the object as an input parameter.

At 604, the method manufactures a symbolic object (e.g., a symbolic mock class) that fulfills the interface contract, the class method signatures, or the delegate input call requirements.

For example, the method examines the interface type, the methods implemented by the class, or the delegate signature call, and the method provides a call receiving stub(s). The call receiving stub, is designed to receive (e.g., has corresponding call input parameter types, or a message in-box designed to receive) the calls defined in the interface, methods of the class, or the delegated method signature.

Additionally, manufacturing comprises providing mocked behavior (program statements, source code, etc.). The provided (e.g., default) mock behavior is as follows: Every time a method (or stub, or message in-box, or external resource, etc.) is called on the created mock object, fresh symbolic values are given back to the caller as the outputs of the method (or call, or message, etc). Additionally, the default mock behavior keeps track of which symbolic values were handed out and when. These symbolic values can be thought of as additional inputs.

Or, at 604, the method manufactures a call receiving entity with mock behavior. For example, the manufactured entity comprises a call receiving stub and mock behavior. Or, at 604, the method manufactures an external resource for receiving a call or message, along with shallow behavior. The shallow behavior is created automatically and assists the calling resource by returning a symbol useful in symbolic execution of the calling resource.

After the mock object (or other external mock behavior) is created, the method continues at 606.

At 606, the call to the parameterized unit test (comprising an input parameter of a mocked object, interface, etc.) is explored by symbolic execution. Symbolic values are used as inputs; symbolic values can represent instances of mock classes, or values of other types, e.g. integers. Each execution path is associated with a path condition, i.e. the set of conditions over the symbolic values that must hold for the path to be executed. Or, at 606, a call comprising mocked behavior is symbolically executed.

Optionally, the method performs 608. In one example, this step is performed if more than one level of mock behavior is indicated. In one example, the method provides two levels of behavior: (1) friendly and (2) unconstrained behavior. In another example, the method provides three levels of behavior, (1) friendly, (2) constrained, and (3) unconstrained. In one example, these behaviors are indicated (e.g., annotation) by a test programmer. In one example, a programmer annotates an input parameter with the desired levels of behavior (e.g., TestMethod(input Int x, input [Friendly Mock] Interface y, input [Unconstrained Mock] Delegate x). These descriptions provide an insight into how a programmer desires an automatically generated behavior to perform. For example, a friendly mock will only exhibit behaviors which will not lead to a test failure. An unconstrained mock will follow the type system, but otherwise behave in an unconstrained manner (which is helpful in locating bugs), and a constrained mock will behave according to a set of explicit rules but otherwise behave as an unconstrained mock. For example, a constrained mock will not index an array out of bounds, if the index is constrained to friendly characteristics (e.g., TestMethod (input [Constrained: arrayindex] Delegate y, input Int y), but will otherwise behave as unconstrained. Thus, an example friendly mock is optionally provided.

At 608, the method prunes a level of mock behavior. For example, the method prunes for friendly behavior. Thus, for a mock indicated as friendly, or for a mock behavior with a property constrained as friendly, a path is pruned.

For example, if a path leads to a failure, that is a program point where a test must be aborted (e.g. a program point where an exception is thrown, or an assertion is violated) the path is pruned if: (1) the path condition refers to a symbolic value that was provided as the output of a method of a symbolic mock class, and (2) the user indicated by an annotation that the input, for which this symbolic mock class was created, should be friendly. Pruning means removing a path identified in symbolic execution. Thus, that path will not be populated with a test case including concrete values, and thus, will not be tested.

Not all failure paths are pruned. For example, sometimes a failure is behavior that should be explored in a test. If a failure does not depend on a fresh symbol returned from a mock object, then it is more likely to be a real failure. In other words, if that path would be taken regardless of any symbol returned from a mock object, then that path is not pruned.

At 610, for each terminating path, a solution of the path condition is obtained. Such a solution assigns concrete values to symbolic values. For example, the above symbolic execution identifies path constraints that must be satisfied before an implementation under test will travel a given execution path. Thus, these path constraints represent relationships on symbolic inputs that if satisfied, will force the implementation under test (IUT) down a path (e.g., down a path of basic blocks) to a leaf. Thus, symbolic execution provides the constraints for each decision in the tree, and a constraint solver will solve the conjoined constraints to identify input values (the solution) that will force the implementation through a path of basic blocks into a desired leaf. Since the mock behavior returns a fresh symbolic value every time a method of the mock is called, that symbolic value will (may) be a member of a relationship on symbolic values that determines a solution. Thus, the mock behavior—returning fresh values—provides information used to determine the solution. Of course, the solution is a set of concrete values, at least one of which is returned from the mock object. However, the mock object next is populated with this (these) concrete values, so they are available to the mock object for the instantiation (testing) phase.

At 612, the source code for a concrete mock class is created. For example, for every path that remains, one instantiation of the mock class (type) is created. These instantiations of the mock class are used to run the test cases that return concrete values in response to a mock call. These provide fast re-execution. The methods of this concrete class return the concrete values in the correct order according to the solution determined at 610. For example, the source code for the mock behavior is modified to return the concrete values instead of the fresh symbol, during the testing phase.

Example Pseudo Code

In general an interface is a contract that defines a set of methods. Each method in the set has a method signature including a method name, method inputs, and a method output. In this example, the interface called "IComponent" has a single member method in the set called "GetNumber". The method name is "GetNumber", the output is an integer type, and there are no inputs.

```
public interface IComponent {
    int GetNumber( );
}
```

The following implementation can be executed when providing an implementation of the above contract.

```
public class Implementation
{
    public static int Compute(IComponent c)
    {
        return Math.Abs(10 / (c.GetNumber( ) + c.GetNumber( )));
    }
}
```

The following parameterized unit test has been annotated to use a mock object.

```
[TestMethod]
public void TestMethod([TestMock] IComponent c)
{
    int result = Implementation.Compute(c);
    Assert.IsTrue(result >= 0);
}
```

When performing the above "Example Method Generating Mock Objects" on the above "TestMethod", the following two Mock Objects are created. In review, symbolic execution determines path constraints based on symbolic values returned from the mock objects. These path constraints are provided to the constraint solver to create concrete return values from the mock objects (e.g., MockClass0—"return 42, return 23, throw exception". Thus, the method (1) automates obtaining path constraints via symbolic execution, (2) automates obtaining concrete solutions from the path constraints, and (3) automates populating the mock objects with concrete values. Thus, the method obtains descriptions of two mock classes as follows:

```
// mock class for which test passes correctly
public class MockClass1 : IComponent
{
    private static int __GetNumber__counter;
    int UnitTests.IComponent.GetNumber( )
    {
        switch (__GetNumber__counter++)
        {
            case 0:
                return 42;
            case 1:
                return 23;
            default:
                throw new InvalidOperationException( );
        }
    }
}
// mock class for which test fails unexpectedly: DivideByZeroException
public class MockClass0 : IComponent
{
    private static int __GetNumber__counter;
    int UnitTests.IComponent.GetNumber( )
    {
        switch (__GetNumber__counter++)
        {
            case 0:
                return -7;
            case 1:
                return 7;
            default:
                throw new InvalidOperationException( );
        }
    }
}
```

In the above example, a class called "Implementation" is an implementation under test (IUT). The IUT is being tested by a parameterized unit test (PUT) called "TestMethod". In this example, an interface requiring a contract is an input parameter, thus mock objects are created. Thus, the IUT is symbolically executed and determines path constraints. For example, assume a fresh symbol is returned from each call to "c.GetNumber( )", such as X1 and X2. Notice that, these distinct fresh symbols are returned from the calls to a symbolic object without reference to any actual behavior of a GetNumber method. Thus, symbolic execution identifies a path constraint as follows: Math.Abs(10/(X1+X2)). This path constraint is passed to the constraint solver which determines concrete values that exercise the implementation. For example, there is a set of solutions that cause division by zero (e.g., when (X1+X2)=0). Any member of that set will exercise that path (e.g., ((−7)+(−7)), (0+0), etc). There is also a set of solutions that will return an absolute value (e.g., (1+1), (4+1), (11−1), (42+23), etc). Mock objects are instantiated with the concrete values that exercise the paths through the implementation. There is one mock instantiation for each path. Notably, "MockClass0" causes an exception path due to divided by zero, whereas "MockClass1" causes an absolute value computation. Thus, the automatically created mock behavior of returning fresh symbols sets up relationships on symbols that the constraint solver uses to find concrete values. The instantiations are compiled and can now run tests on the concrete values.

Example Manufactured/Synthesized Mocked Objects

In one example, a manufactured mock object comprises a type/class, but does not require fields. Since the behavior is mocked, it does not need to keep state around. It does not compute anything because all the returned fresh values are symbols. Later, when the mock object is instantiated, it returns concrete values (e.g., MockClass0 above: case 0: return −7; case 1: return 7).

Before instantiation, during symbolic execution the fresh symbolic value is returned and that behavior can be supported by generalized behavior, such as a table or database tracking when and what entity returned the symbolic value.

In one example, the symbolic execution counts how often a method is called. Suppose it is assumed that a program is deterministic. Thus, if a method is called twice, calls to a same method are distinguishable by the order of calls, such as indicated by a count or time. In one example, a counter is associated with a method in a the symbolic object, and an identifier of the method along with a count (or time) of the call, provide a unique identifier of the call (or tuple). Later, upon instantiation of the symbolic object, the order of the call is used again to determine the value returned. For example, in the above instantiated code, a counter (e.g., "__GetNumber__ counter++") increments each call to "GetNumber" which determines the returned value.

During symbolic execution, a table (or database) is maintained which stores information about calls to mock objects (or mocked behavior). For example, for each call to a mock object, a method populates a table with a call count and the method called, thereby providing unique tuple information. In another example, the table stores more information such as a type of the called interface (or class of object), a method identifier (or name), a fresh symbol returned (X1, X2, . . . ), the count (or time) of the call, etc. Other ways are available for providing unique symbols.

A table or database documents symbols returned as mocked behavior. On one example, a mock object is generalized to populate the table. For example, the following method provides generalized mocked behavior, that allows recording information about the call to the mocked object, and returning a fresh symbol:

```
// mock class for which returns fresh symbols during symbolic execution
class SymbolicMockClass: IComponent
{
    private static int __GetNumber__counter;
    public GetNumber( ) {
        return Symbol.GetMockResult (this.GetType( ), "GetNumber",
__GetNumber__counter++);
    }
}
```

During symbolic execution the above method returns a fresh symbol and enters information about the call into the table (database). The method in the MockClass includes a call (e.g., GetMockResult (this.GetType( ), "GetNumber", _GetNumber_counter++)) to the symbolic execution framework that populates the table with the input parameters, such as interface or class type, method identifier, count, etc. In some object-oriented systems, every object has a unique hash code. This could also be used with a count to indicate a unique value (combination).

Notice that the system automatically creates (manufactures, synthesizes, etc.) the above "SymbolicMockClass" for symbolic execution for a given interface ("IComponent" in the above example), and then automatically creates the above two instantiations ("MockClass0" and "MockClass1") for testing the implementation.

In another implementation, the following single MockClass supports both symbolic execution and instantiations.

```
// mock class used in both symbolic execution and instantiations
class SymbolicMockClass: IComponent
{
private static int __GetNumber__counter;
public GetNumber( ) {
        return Database.GetMockResult (this.GetType( ), "GetNumber",
__GetNumber__counter++);
    }
}
```

During symbolic execution, the accessed database returns symbolic values and builds the table. Then path constraints are evaluated to provide path values, which may be columns in the same table. Then at test time, the call to the instantiated mock will access an instantiation populated table, and the table will then return the concrete values. In such an example, the same table (database), and possible even the same class is used to return fresh symbols during symbolic execution and concrete values during instantiations.

Mocking Various Units of Behavior

In a previous example, an interface is passed in as an input parameter and mocked. In another example, one or more interfaces, classes, delegates and/or a methods are passed into a test method, thereby signaling the described technology to create corresponding mock behavior. For example, if a non-sealed class is passed in, a mock sub-class is manufactured (e.g., synthesized) to implement all virtual methods of the non-sealed class. If an interface is passed in, a mock class is synthesized to implement the interface. A delegate is specified with an input type, an output type(s), and a method name (e.g., a method signature). If a delegate is passed in, a mock class with a method with such input and output types is synthesized to implement the delegate.

Alternative Environments or Paradigms

As previously stated, neither the mock objects nor parameterized unit tests are required to practice the technology. They are merely the way it was described and implemented. However, any first resource that depends on a second resource, could benefit from a mocked version of the second resources. Imagine a program or function in another language paradigm, that calls another program or function for services. Based on the call signature, a behavioral mock method could return a symbolic output. Thus, a mock environment could identify these calls that depend on external resources and return fresh symbols as described above. In this way, relationships on symbols are maintained (e.g., fresh symbols) in this alternate paradigm without having to explore the actual implementation of the external resource. By not exploring the actual resource (whether because non-existent, missing, remote, etc.) the mock behavior provides the described efficiencies. So long as the relationships of branch/path constraints are maintained on the symbols, the test environment can provide test cases for code or branch coverage.

The concept is automating the process of providing mock behavior for an external resource, when an implementation under test calls the external resource during symbolic execution. The idea is to substitute the mock behavior, instead of extending the symbolic execution into the called component. Overall, this disclosure focuses on an object-oriented environment of objects and defined interfaces, and using symbolic analysis to instantiate an interface. An interface is a syntactic description of an (mock) object. There are queries, and there are answers formed according to the interface. And the mock objects provide the messages or parameters with contents (i.e., given that query (message) there will be this answer). So, in a more general framework, with queries and answers or messages, the technology would work just as well.

Exemplary Variations

Mock objects are generated automatically including, for example, their intended or indicated behavior. In one example, symbolic execution is used to generate mock objects. For example, mock object behavior is generated for object-oriented programs. An arbitrary number of mock objects are generated based on requirements of an IUT, and/or user indications. The described technology provides the possibility of manufacturing friendly (expected behavior), constrained (partially expected behavior), or unconstrained (behavior ranging over the type system) mock objects. The manufacture is automated and may occur with user request, or possibly transparent to a user as an automated testing support. For example, the user may select a unit test, a behavior level, and a partial constraint. Or, a user may request testing an implementation, and the request is provided with one or more levels of mocked behavior, transparent to the user, or transparent until results of the test are reported. If desirable, the user may indicated (e.g., annotate) desired mock behavior (e.g., select a level(s) on aberrant behavior). For example, the user may annotate that mock behavior is friendly, etc. The described technology allows the successful execution of a partial system, for example, with friendly mock objects. Testing may also be directed at finding bugs, for example, with constrained, unconstrained, etc. mock objects. Additionally, for efficiency, the technology provides a minimal number of mock objects, while maximizing coverage of an IUT. For example, the technology only mocks behavior required by the implementation under test. In one example, minimum mocking is provided because symbolic execution discovers paths that lead to calls to external resources, and they need only be mocked once located, and then, only if indicated as mocked, or if defaulted as mocked, etc. Thus, a minimum number of mocks are created to test the calling component. Finally, in an above example, allowed behavior can be constrained using formalism, such as parameterized unit tests, such as with asserts, or annotations on input parameters to the parameterized unit test, etc.

Mocks Returning Mock Behavior

Another consideration is how to handle when a return value of an object is also an object. For example, instead of "GetNumber( )" returning an integer, what if the method call was "GetInterface( )" that returned an interface. Whenever, the return type of a mocked object, is a type that can itself be mocked (e.g., interface, class, delegate, etc.) then another mock is created (synthesized) as the output. But if the returned type is an object that can not be mocked (such as a sealed class), then if a symbolic member of that type previously exists in the symbolic execution space, then it is returned. For example, if a symbolic object of that type was passed in as a parameter in a call to a mock object, then that is returned. For example, in the table above that collects the call count, type, and fresh symbols; the input parameters to the call can also be collected in the table. If an input parameter of that type is in the table, even in this call, it is returned. Returning these parameter values allows to continue symbolic execution, when choices are otherwise limited.

Supporting Symbolic Exceptional Output

In most object-oriented programs, there are two kinds of outputs of a method: Normal and exceptional output. To support this paradigm, a method of a symbolic mock class has the choice whether to return normal outputs, or a symbolic exceptional output. Symbolic execution will explore both branches. During symbolic execution, a symbolic exception can be thrown, meaning it could be explored for all exceptions types, as with all otherwise unconstrained mock behavior. This is because the symbols represent the possibility of "any" assignment that obeys the type system.

Thus, instead of unconditionally returning a fresh symbol, the following code also provides exceptional behavior. GetCallNormalResult represents the choice between normal and exceptional behavior.

```
// mock class for which returns fresh symbols during symbolic
execution
class SymbolicMockClass: IComponent
{
private static int __GetNumber__counter;
public GetNumber( ) {
    if (SymbolicExecutionFramework.GetCallNormalResult( ))
    then
        return Symbol GetMockResult (this.type,
            __GetNumber__counter++);
    else
        return Symbol GetMockExceptionResult (this.type,
                                GetNumber__counter++);
    }
}
```

Symbolic execution will split and try both paths. Thus, if there are "n" calls to this GetNumber method, then there are $2^n$ possible combinations, which grows too fast for practical applications. Thus, the symbolic execution framework, will default to a reduced selection of exceptional behavior, but the user can annotate the test to increase exposure to exceptional behavior, when desirable. For example, the user can annotate that exceptional behavior should be selected no more often than an indicated percentage of calls, which is distributed randomly.

Friendly Mocks: Pruning Failure Paths Dependent on Mocks

The following pseudo code provides an example of pruning a failure path dependent on symbols returned from mock objects.

```
void Test (int x, Interface y) {
    int z = 10/x;
    int a = y.ObtainValue(z);
    int b = 10/a;
}
Execution Paths:
    1. x = 0                              Exception
    2. x ≠ 0 and a = 0                    Exception
    3. x ≠ 0 and a ≠ 0
```

In this example, the test method has three execution paths. The first path throws an exception when x is zero. This failure path has nothing to do with a mock symbolic output, and thus would not be pruned in creating a friendly mock. The second path is also a failure, but is dependent upon the mocked output "y.ObtainValue( )". Thus this path is pruned when manufacturing a friendly mock object.

Notice above that "Interface y" is passed as an input parameters of a parameterized unit test. This signals to the method described above, to create mock objects for any behavior required for that contract (e.g., y.ObtainValue(z)). In one example, a mock object is only created to implement this method, since it is all that is required for the test. In that case, the very minimum of mock behavior is created (e.g., single method). In another example, the selected behavior is annotated instead of default (e.g., Test (int x, [Friendly] Interface y)).

Unconstrained Mock Objects

Unconstrained mock objects are ideal when they represent user provided components whose behavior cannot always be predicated. However, they are undesirable in certain contexts, since they can cause the symbolically executed code to behave in an unrealistic way. Without further constraints, symbolic mock objects obey the type system, but they will not respect other, often implicit, behavioral assumptions. Previously, an optional method was described for providing friendly mock objects. Absent pruning to create a friendly object, a mock object will provide unconstrained behavior. But other constraints can be placed on mock objects.

Constrained Mock Objects

It is often desirable to restrict the degrees of freedom available to a mock object. Thus, a rule or contract is provided to the theorem prover, to constrain behavior of a mock object, as the theorem prover examines relations on path constraints. Thus, a test programmer merely needs to provide a rule that the theorem prover needs to consider when generating path constraints. If an unconstrained symbolic value would otherwise range over an assignment set, the rule limits the range of the symbol.

For example, a hash table functions as a mathematical map only if the keys follow certain rules regarding the properties and interplay of the GetHashCode and Equals methods of a HashClass. A map is a function that projects one set (the domain) into another (the range). A hash table is considered to be a map if the hashing function is consistent with the equality test used.

In this example, a parameterized unit test is used as input to a method that generates a rule for providing to the theorem prover to constrain a mock object. In this example, the parameterized unit test provides an input:

```
[TestMethod]
void GetHashCodeEqualsSpec(object x, object y) {
    if (x != null && x.Equals(y))
        Assert.IsTrue(x.GetHashCode( ) == y.GetHashCode( ));
}
```

An axiom, formula, or rule is generated from the parameterized unit test (PUT), if desirable, by a variation of symbolic execution. As the statements of a parameterized unit test are executed symbolically, the constraints and assumptions are saved as path conditions. The performed operations may be recorded in a table or heap. For each assertion in the parameterized unit test, an axiom formula (or a summary of behavior) is generated that states that the assertion condition must hold under the aggregated path condition at the time of the assertion.

```
[TestMethod]
void GetHashCodePure(object x) {
    if (x != null)
        Assert.IsTrue(x.GetHashCode( ) == x.GetHashCode( ));
}
```

For example, exploring GetHashCodePure may generate the following universally quantified formula (constraint rule):

$$\forall \text{ count, object. (object!} = \text{null)} \vee \rightarrow$$
$$\text{GetHashCode (count, object)} =$$
$$\text{GetHashCode (count+1, object)}$$

Simply stated, for all count and all objects, if object is not null, then the GetHashCode of the object on an initial call to GetHashCode should equal the GetHashCode of the same object on a subsequent call.

Now, when GetHashCode is called as a mocked object during symbolic execution (after the above rule is provided to the theorem prover), it will return the following fresh symbols:

```
GetHashCode(0,x)
GetHashCode(1,x)
GetHashCode(2,x)
```

Notice that this table provides a method identifier (GetHashCode), a type/class identifier (x), and a call count on the method (0, 1, 2). This tuple is unique in most any execution space and also maintains an order of the call. This is another example of how to track fresh symbols, using a tuple. Here the method name and a counter (tuple) is used to provide/track a fresh symbol. Additionally, in constructing the universally quantified formula (constraint rule), a counter is used instead of an intentional heap (U.S. patent application Ser. No. 11/197,912, "Symbolic Execution of Object Oriented Programs with Axiomatic Summaries", filed Aug. 4, 2005, which is incorporated herein by reference thereto).

With this constraint provided to the theorem prover, consider a symbolic execution of the following test method that mocks a constrained object:

```
[TestMethod]
void ExampleTest([Constrained Mock] object x) {
    i= x.GetHashCode( );
    j= x.GetHashCode( );
    r= x.GetHashCode( );
    Assert.IsTrue(i==j && j==r);
}
```

During symbolic execution of the mock x, the above table will be constructed. The theorem prover will refer to the constraint rule and prune to the following paths:

| Path | Condition | Result |
|---|---|---|
| 1. | x = null | Throw Exception |
| 2. | x ≠ null and i==j==r | Success |

The constraint requires i, j, and r, to be equal. The assignments may freely range over the type class for that symbol, but they will only provide paths that are equal with respect to the constrained value, or object.

To review, the user provides a rule to the theorem prover. Or, the rule is created from a parameterized unit test provided by the test programmer. The theorem prover will honor these rules when generating path constraints. When the theorem prover identifies a path that violates the rule, that path is pruned (removed).

Thus, after symbolic execution, the constraint solver will limit the concrete values assigned according to whatever additional rules are introduced. The constraint solver and/or theorem prover can assist in making sure that mock objects obey the rules. Such restricted mock objects are called constrained.

It is important to realize that there are other properties that are not being constrained when a constrained mock is created. For example, the hash code returned should never change on a given object, but that property is not introduced in this parameterized unit test. And thus, the mock object will remain unconstrained in regard to other properties not introduced. Thus, the whole behavior of a constrained object does not need to be restrained.

Exemplary System for Generating Mock Objects

Figure 7:
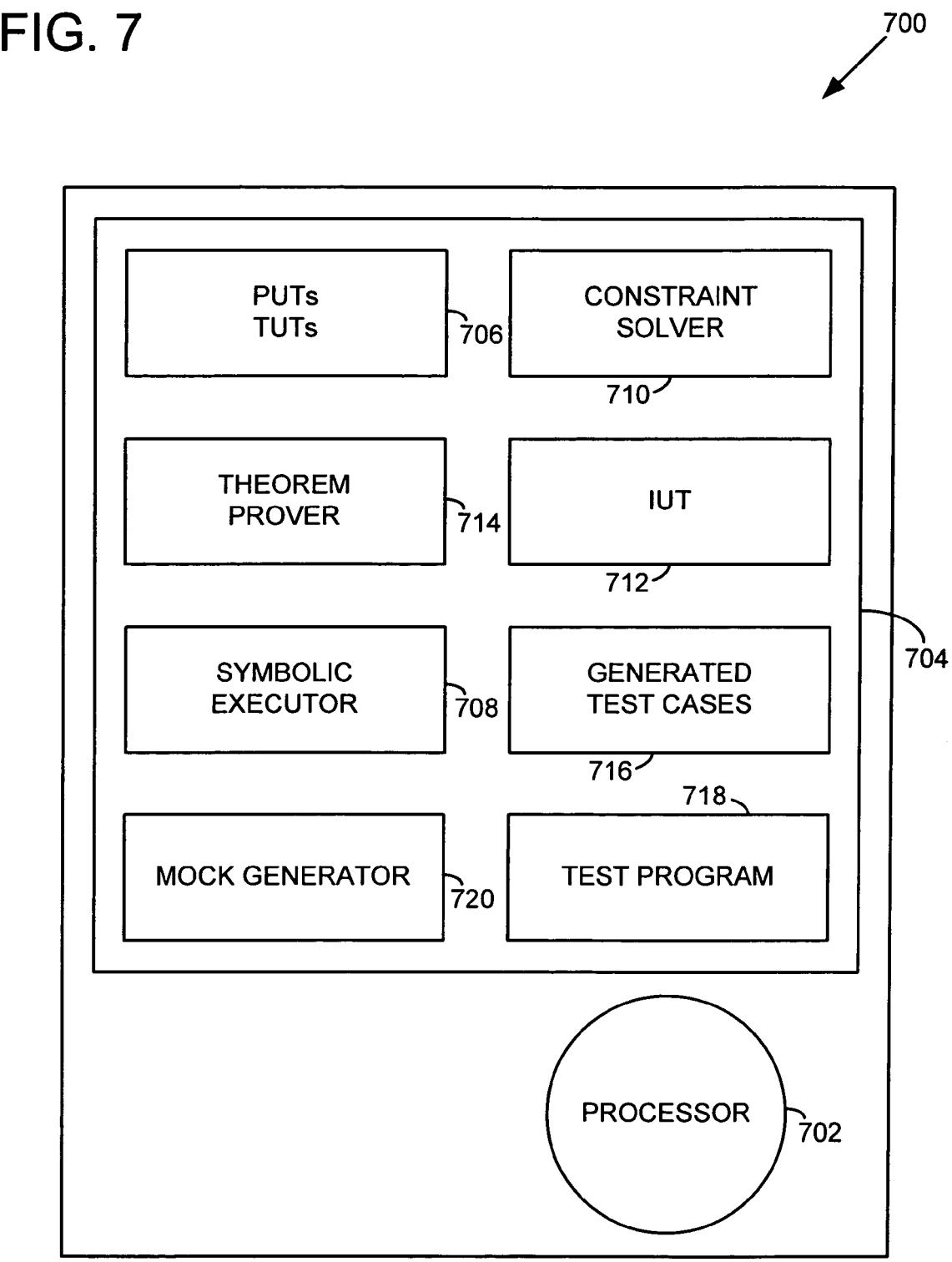
FIG. 7 is a block diagram of an exemplary system providing mock object generation.
}

FIG. 7 is a block diagram of an exemplary system for testing programs. The system 700 comprises a digital processor 702, digital memory 704, a test program in memory 718, and several other computer readable resources including a constraint solver 710 and or a theorem prover 714, an implementation under test (fUT) 712, a symbolic executor 708, a mock object generator 720, and optionally, generated test cases 716 and or unit tests 706 (such as a traditional unit test and or a parameterized unit test)

In one example, the test program directs an automated mock object generation using various other components such as the described resources 704. Of course, one of the other components such as the mock object generator may manage interaction between other components. The mock behavior generator 720 identifies an interface indicated for mock behavior. In one example, the interface is identified in input parameters of a parameterized unit test 706. The mock generator creates a symbolic object comprising a stub to receive calls and creates mock behavior comprising returning fresh symbols upon receiving a call to the stub. A symbolic executor 708 executes the parameterized unit test symbolically to obtain path constraints for an implementation under test 712. At least one path constraint comprising a fresh symbol returned in response to the call to the stub. The constraint solver 710 provides solutions for the path constraints comprising a concrete value assigned to the returned symbol. The mock behavior generator 720 creates a mock object that returns the concrete values. Optionally, a test program 718 handles user interaction and directs activities of other components comprising the mock behavior generator, the symbolic executor, and the constraint solver. In one such example, the test program executes the solutions as instantiations of the parameterized unit test. Optionally, the system includes a graphical component (not shown) for receiving user inputs comprising an indication of at least one annotation from the user. The graphical component generates on-screen choices.

Example Counters

In various examples a global counter was provided. This is feasible because the global counter monitors the order of analysis, and input or output parameters can be associated with the unique count.

Another way to provide a count is on a per method basis. Then uniqueness is provided by the method and or type identifier, and its local count. This count could be made even more precise by only counting a method call as a subsequent call if they have the same argument types. However, the more finite the granularity of the counter, the more precise the reasoning of the theorem prover must be.

Exemplary Computing Environment

Figure 8:
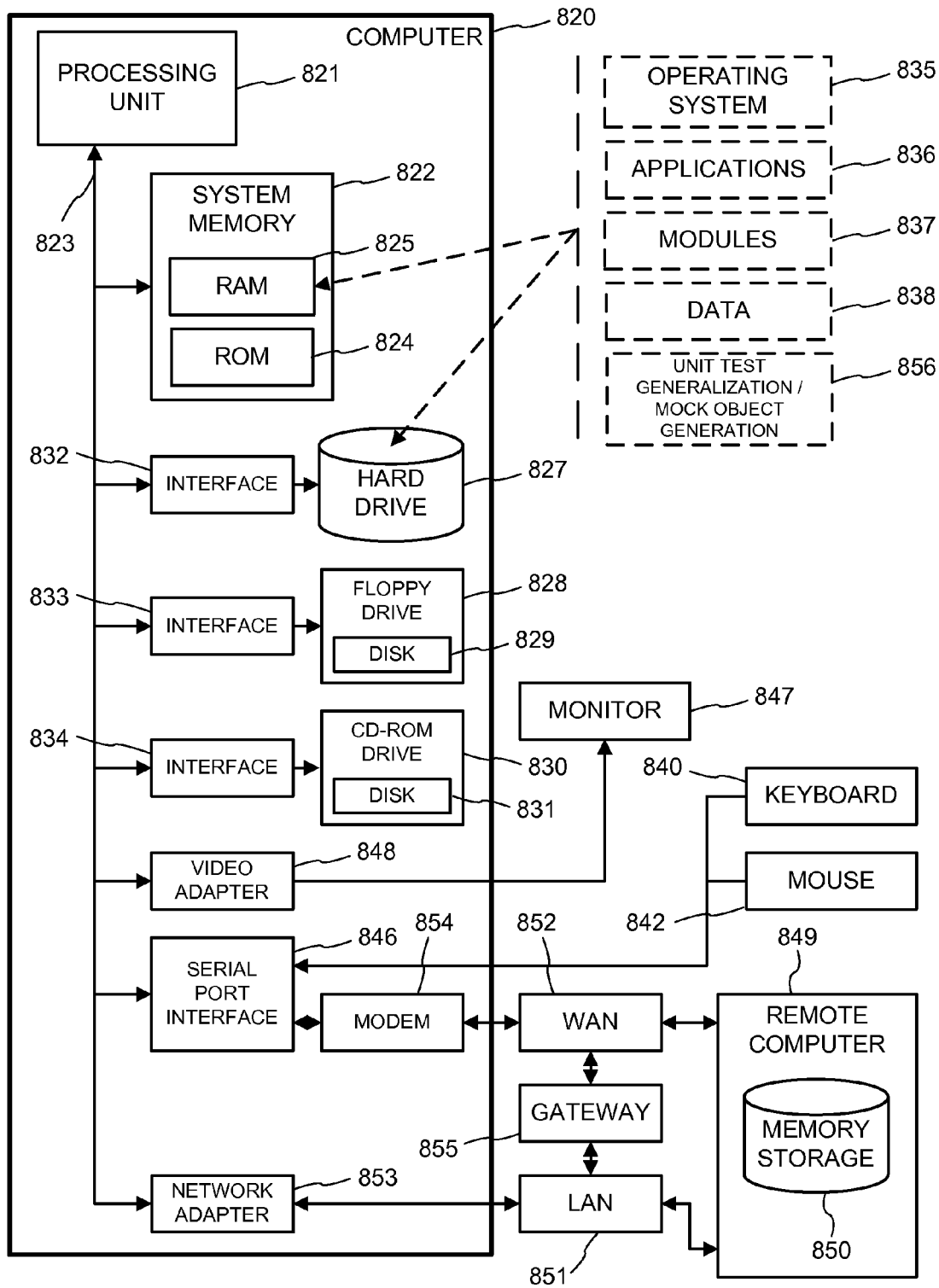
FIG. 8 is a block diagram of a computing environment supporting the unit test generalization and/or mock object generation.

FIG. 8 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 8, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838, in addition to an implementation of the described unit test generalization and or mock object generation 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of this technology with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of these features may be applied, it should be recognized that the details are illustrative only and should not be taken as limiting the scope of the claims. Rather, we claim as our invention all such embodiments as may come within the scope and spirit of the following claims and equivalents thereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computerized method comprising:
   receiving a unit test comprising a test of an implementation;
   creating a parameterized unit test from the unit test comprising replacing plural concrete values in the unit test with symbolic values and exporting the symbolic values into a signature of the parameterized unit test;
   symbolically executing the parameterized unit test to identify path constraints of the implementation; and
   creating test cases that conform to the path constraints identified during symbolic execution.

2. The method of claim 1 wherein replacing plural concrete values in the unit test with symbolic values further comprises replacing an object with a symbolic object or mock object.

3. The method of claim 1 further comprising:
   upon identifying a test case comprising a successful path through the parameterized unit test, associating the test case with the parameterized unit test; and
   upon identifying a test case that violates an assert statement of the parameterized unit test, modifying an altered parameterized unit test, and associating the test that violates the assert statement with the altered parameterized unit test.

4. The method of claim 3 wherein modifying the altered parameterized unit test comprises adding a program statement to the altered parameterized unit test, the added program statement comprising an expected exception statement.

5. The method of claim 3 wherein modifying the altered parameterized unit test comprises removing a violated assert statement from the altered parameterized unit test.

6. The method of claim 1 wherein the test cases are associated with the parameterized unit test as an inline database.

7. The method of claim 1 wherein the test cases associated with parameterized unit tests comprise relations of symbolic values provided as assume statements.

8. The method of claim 3 wherein identifying a test case that violates an assert statement comprises catching a thrown exception, and modifying the altered parameterized unit tests comprises annotating the altered parameterized unit test with an expected exception statement of a type corresponding to the thrown exception.

9. The method of claim 1 further comprising:
   receiving user inputs indicating concrete values for generalization; and
   while creating the parameterized unit test, determining at least one of the plural concrete values to replace based at least in part upon the received user inputs.

10. The method of claim 1 wherein exporting the symbolic values into the signature comprises exporting all replaced values.

11. The method of claim 1 further comprising receiving user inputs comprising a user indication of at least the unit test, a concrete value, and a coverage criteria.

12. The method of claim 11, wherein the coverage criteria is code coverage.

13. The method of claim 1 wherein the test cases comprise code coverage for the implementation under test.

14. A system for testing programs comprising:
   a digital processor; and
   computer memory comprising:
      a traditional unit test comprising an implementation under test:
      a test generalizor for modifying the traditional unit test into a parameterized unit test, the modifying comprising:

replacing plural concrete values in the traditional unit test with symbols; and exporting the symbols into a parametric signature of the parameterized unit test;

a symbolic executor for identifying constraints while symbolically executing the created parameterized unit test of the implementation under test; and a constraint solver that generates a set of test cases by solving for values that satisfy the series of constraints.

15. The system of claim 14 wherein the computer memory further comprises a graphical component for receiving user inputs comprising an indication of at least one of the plural concrete values to replace with symbols.

16. The system of claim 15 wherein receiving user inputs further comprises a user indication of at least the unit test and a coverage criteria.

17. The system of claim 14 wherein exporting the symbolic values into a parametric signature of the parameterized unit test comprises exporting all replaced values.

18. A computer readable medium comprising computer executable instructions comprising:

instructions for receiving a unit test of an implementation under test;

instructions for creating a parameterized unit test from the unit test comprising replacing plural concrete values in the unit test with symbolic values and exporting the symbolic values into a signature of the parameterized unit test;

instructions for symbolically executing the parameterized unit test;

instructions for identifying one or more path conditions during symbolic execution;

instructions for generating test cases comprising inputs for the parameters of the parameterized unit test; and instructions for verifying an implementation under test by executing the generated test cases on the inputs to the parameterized unit test.

19. The computer readable medium of claim 18 further comprising:

instructions for identifying a successful test case comprising a successful path through the parameterized unit test, and for associating the successful test case with the parameterized unit test; and instructions for identifying a test case that violates an assert statement of the parameterized unit test, and for associating the test case that violates the assert statement with an altered parameterized unit test.

20. The computer readable medium of claim 19 wherein the altered parameterized unit test comprises adding an expected exception statement to the altered parameterized unit test responsive to identifying the test case that violates the assert statement.

* * * * *

UNITED STATES PATENT AND TRADEMARK OFFICE
CERTIFICATE OF CORRECTION

PATENT NO. : 7,587,636 B2
APPLICATION NO. : 11/323032
DATED : September 8, 2009
INVENTOR(S) : Tillmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Twenty-first Day of September, 2010

David J. Kappos
*Director of the United States Patent and Trademark Office*